SYSTEM FOR TELEPHONE ANSWERING AND RECORDING
AND FOR MESSAGE RECORDING AND REPRODUCING

Filed Jan. 5, 1951 8 Sheets-Sheet 1

INVENTOR:
John Dexter Lane
BY Ezekiel Wolf
his Attorney

INVENTOR:
John Dexter Lane
BY Ezekiel Wolf
his Attorney

INVENTOR:
John Dexter Lane
BY Ezekiel Wolf
his Attorney

March 5, 1957 J. D. LANE 2,784,254

SYSTEM FOR TELEPHONE ANSWERING AND RECORDING AND FOR MESSAGE RECORDING AND REPRODUCING

Filed Jan. 5, 1951 8 Sheets-Sheet 4

INVENTOR:

John Dexter Lane

BY Ezekiel Wolf his Attorney

INVENTOR:
John Dexter Lane
BY Ezekiel Wolf
His Attorney

March 5, 1957 J. D. LANE 2,784,254

SYSTEM FOR TELEPHONE ANSWERING AND RECORDING AND FOR MESSAGE RECORDING AND REPRODUCING

Filed Jan. 5, 1951 8 Sheets-Sheet 6

INVENTOR:
John Dexter Lane
BY Ezekiel Wolf
his Attorney

March 5, 1957 J. D. LANE 2,784,254

SYSTEM FOR TELEPHONE ANSWERING AND RECORDING AND FOR MESSAGE RECORDING AND REPRODUCING

Filed Jan. 5, 1951 8 Sheets-Sheet 7

INVENTOR:

John Dexter Lane

BY Ezekiel Wolf his Attorney

March 5, 1957

J. D. LANE 2,784,254

SYSTEM FOR TELEPHONE ANSWERING AND RECORDING AND FOR MESSAGE RECORDING AND REPRODUCING

Filed Jan. 5, 1951

8 Sheets-Sheet 8

INVENTOR:
John Dexter Lane
BY
Ezekiel Wolf
his Attorney 2,784,254

SYSTEM FOR TELEPHONE ANSWERING AND RECORDING AND FOR MESSAGE RECORDING AND REPRODUCING

John Dexter Lane, Boston, Mass.

Application January 5, 1951, Serial No. 204,512

29 Claims. (Cl. 179—6)

The present invention relates to a system combining automatic telephone answering service, message recording service together with a message recording and repeating system which may also be used for dictation and repeating for a typist to type.

The applicant recognizes that the art of automatic answering and recording telephone messages is not new and that various systems have heretofore been employed using various types of recording mechanism and various arrangements and connections with the telephone system. In some of these systems, the pick up is accomplished acoustically and in some electrically, without being directly connected to the telephone system, while in other cases the system is cut in to the telephone lines and therefore more directly coupled. The latter system is preferable in many cases as by means of direct coupling a more efficient recording and transmission may be obtained, but in other respects such a system has its disadvantages, since usual telephone installations in homes and offices are owned by communication companies who do not generally permit connections to be made to the system. Further it is desirable to be isolated from the telephone system. Further with the use of direct connections, the system is always tied into the telephone circuit and is not in general therefore portable or removable at will.

The present invention employs preferably a system which is disconnected with the usual telephone service and which will function simply by being placed in close association with the telephone for a telephone answering service. While this is an important feature of the present invention, the invention may be used apart from this function as a telephone answering system as has above been mentioned in connection with recording, reproducing, dictation and for other purposes.

A novelty in the present invention therefore resides more particularly in the various combinations and associations of elements and units which make the present device efficient, useful and adaptable for a great many home and office purposes. The device is contained in a portable unit which may be placed in association with the telephone when the individual is going out and wants to use it as an automatic telephone answering service, or it may be used entirely apart from the telephone for usual office purposes.

A further advantage of the present invention is that two telegraphone transports are used in combination with a switching system by means of which a great many combinations of transfer of messages, parts of messages or transposition of records from one recorder to the other recorder may be obtained, so that a person can edit spoken composition whether received over the telephone or dictated directly with very great ease and with wide facilities for all kinds of changes. By transport in the present invention is meant a wire tape or other type of recording instrument by means of which the spoken messages or sounds may be recorded and afterwards reproduced, the transport including the moving mechanism and the moving elements on which the record is made and from which it is reproduced.

The present invention is further adapted for use as a dictating and typing system for a typist with automatic remote controls.

A further advantage of the present system is the use of a timer with various controls operated in time sequence for providing an announcement and a recording which preferably is combined with two telegraphone transports.

A further advantage of the present invention is the use of a keying system in the control of the telephone subscriber himself which is preferably responsive to tones of definite signals or secret code for the purpose of obtaining information of messages which have been recorded on his answering service by calls from a distant telephone station.

The system will also operate to permit the subscriber to record a message of his own of any length within the limit of the transport capacity whether he is calling from a distance or at his own station. A further and important advantage in the present system is the protection which the system affords against operation from stray noise signals and from such things as the dial tone of the telephone itself, present when the phone is off the hook or from other shocks, surges or internal break-down which might impress a pulse on the answering system. The system is also protected from interfering itself with the telephone when anything goes wrong with it.

Without further describing the merits and advantages of the present invention, the invention will be described in connection with the drawings illustrating an embodiment thereof in which.

In the system of the present invention, certain commonly used notations are employed to describe units forming a component part of the system in which the present invention resides.

In the specification which follows, the word "transport" is used to denote a telegraphone recorder and reproducer operated by an electric motor and switched from so-called run forward to rewind by a solenoid which usually actuates a clutch transmission.

In the present application the actuation of the solenoid throws the transport from forward running to rewind and the releasing of the solenoid permits the transport to automatically shift from rewind to run forward. The forward running position of the wire, tape or other medium which is used for the record, passes first over the erase coil which erases the last record before the new record is replaced. In the opposite direction of rotation of the record, which is the rewind direction, the wire passes first over the voice coil before reaching the erase coil, but in this case in the present invention the erase coil is always shorted out of the circuit by a switch which operates in conjunction with the solenoid for shifting from forward to rewind. This designation of "forward" and "rewind" is used throughout the specification and is intended to define the direction of the wire travel in all cases.

Any number of standard transports may be used in connection with the present invention, but it may be pointed out that the automatic interlocking of the erase head switch and the solenoid operation previously mentioned to prevent erasing during the rewind is a new arrangement in the present system.

As a further general statement concerning the present system, it may be pointed out that various types of amplifier units will be mentioned. These may be of standard designs adapted for definitely chosen range of operation, sensitivity with other controls and limits commonly used in such apparatus.

The system of the present invention also employs a number of other standard units which include oscillators for producing so called Beep's signal, ultra-sonic oscillators, generally used for erasing of transport records and transducer units which are generally designated as electromagnetic and electroacoustic transducers. The class of transducers refers in general to a broad class of translating devices which are standard and available for use in the present invention.

Figure 1:
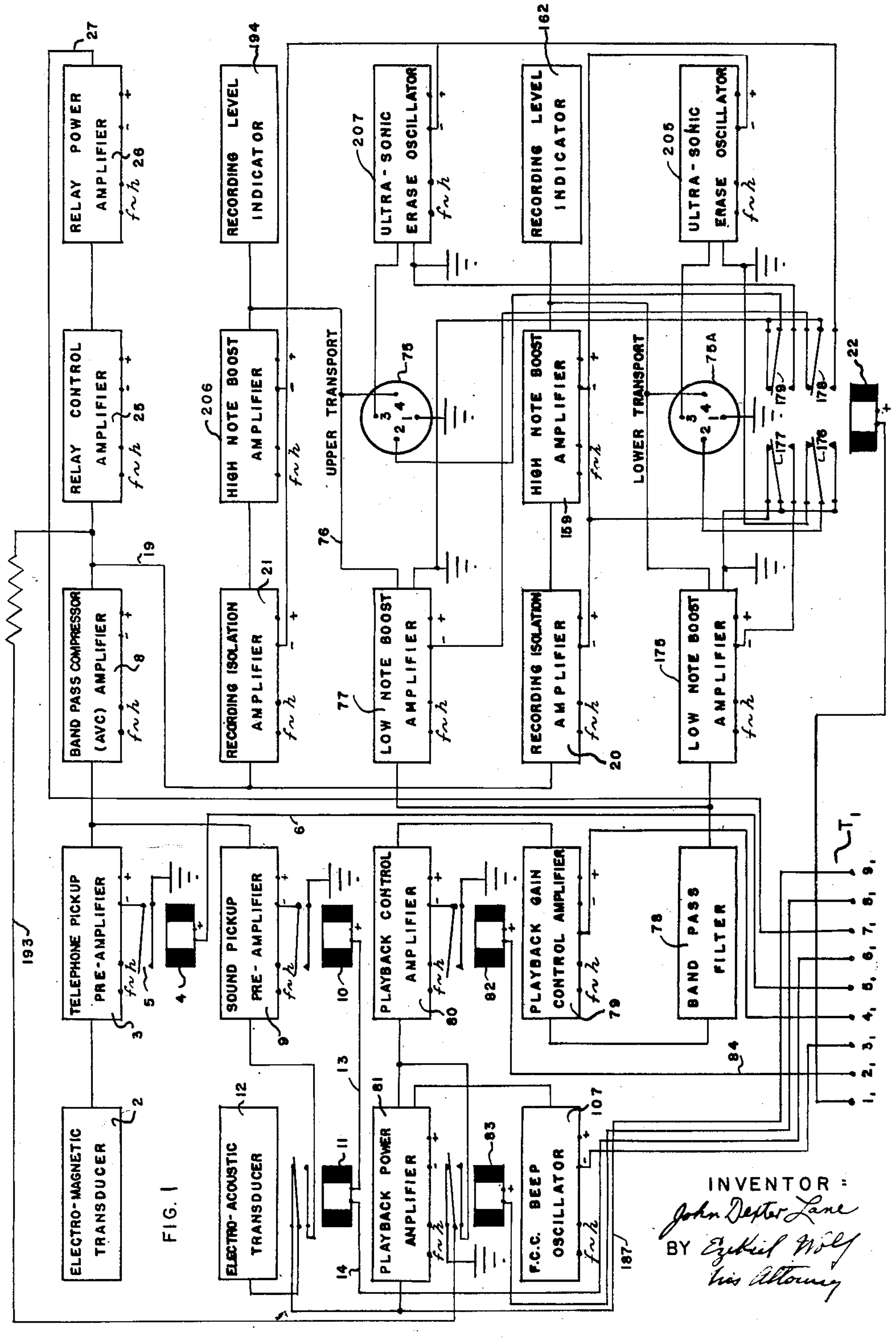
Figure 1 shows a block diagram of the system with certain other elements indicated schematically.
Figure 2:
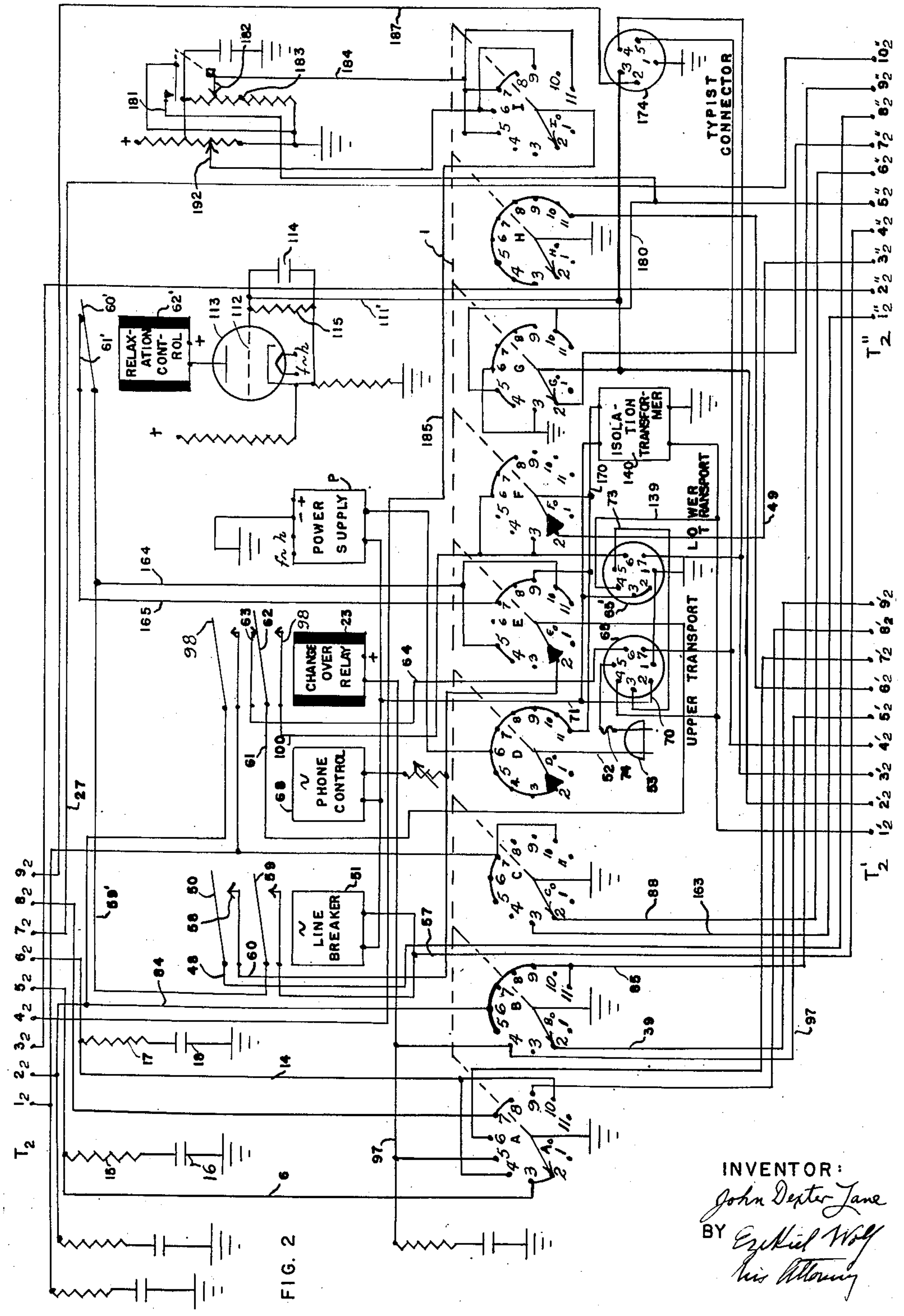
Figure 2 shows a circuit diagram of a portion of the system with related terminal connections to Figure 1.

The block diagram of Figure 1 shows schematically the circuit for the play-back, record-erase apparatus which together with other elements of the system is controlled by manual operation of the gang switch 1 shown in Figure 2. Referring to the block diagram of Figure 1, an electro-magnetic transducer 2 picks up through induced coupling the telephone ring and also other signals and voice coming into the telephone instrument. The energy picked up by the electro magnetic transducer is impressed upon the input of the telephone pick up pre-amplifier 3 which is energized dependent upon the position of the relay 4 associated with it. When the switch or contacts 5 of the relay 4 are closed, then the telephone pick up pre-amplifier is operative otherwise it is not. The closing or opening of the contacts 5 are dependent upon the position of the gang switch 1.

Assuming that the gang switch 1 is in the position indicated in Figure 2 where the rotating gang switch arms A, B, C, D, E, F, G, H, I, are in position on contact 2 which is the position for telephone answering, then the relay 4, Figure 1, is energized through the contact on the section A of the gang switch 1 as may be traced over the line 6 of Figure 2 and its continuation on 6 of Figure 1, returning through the plus powerline as indicated by the plus sign on the relay.

It will be noted throughout the present specification that for clarity the plus supply has been designated in the drawing with a plus sign, the connection for which goes to the power supply unit (Figure 2). When the relay 4 is closed, the energy received on the telephone pick up pre-amplifier 3 is passed on to the band pass compressor amplifier 8 which in effect operates as an automatic volume control.

In the position of the gang switch on the contacts 2, the sound pick-up pre-amplifier 9 is deenergized because its relay 10 remains deenergized. This relay 10 is in series with the relay 11 controlling the operation of the electro acoustic transducer 12 whose function will be described later and the circuit for the relays may be traced from Figure 1 over the lines 13, 14, continuing on the line 14 of Figure 2 which is connected to the contact 4 on the gang section A.

It should be noted that the line 6 which connects to the contact 3 and then 2 in series on the section A has a connection to ground through a resistance 15 and capacity 16. These resistances and capacities are for spark suppression across switch contacts and are generally used in other parts of the system without numeral designations. The line 14 is similarly connected to ground through the resistance 17 and capacity 18 and this line also has a connection to the contact 10 on the section A of the gang switch.

From the circuit above, it will be seen that both the relays 10 and 11 are deenergized and that the sound pick-up preamplifier is under these conditions also deenergized. The energy after going through the band pass transducer amplifier 8 is fed over the line 19 to the recording isolation amplifier 20 for the lower transport, the recording isolation amplifier 21 for the upper transport being in an inoperative state in the position 2 of the gang switch except under certain conditions which will be more fully explained later which relate to the operation of the relay 22, Figure 1, and the change over relay 23, Figure 2, as controlled through the timer 24 shown in Figure 3.

Actually the first operation in the function of the system is to raise the telephone receiver off the hook and then following this, a message is given and then apparatus is put in operative condition for recording a message which may be received through the telephone receiver.

Before describing the arrangement for the functioning of the reception of the given message, the operation of the elements for lifting the telephone receiver will be described.

Figure 3:
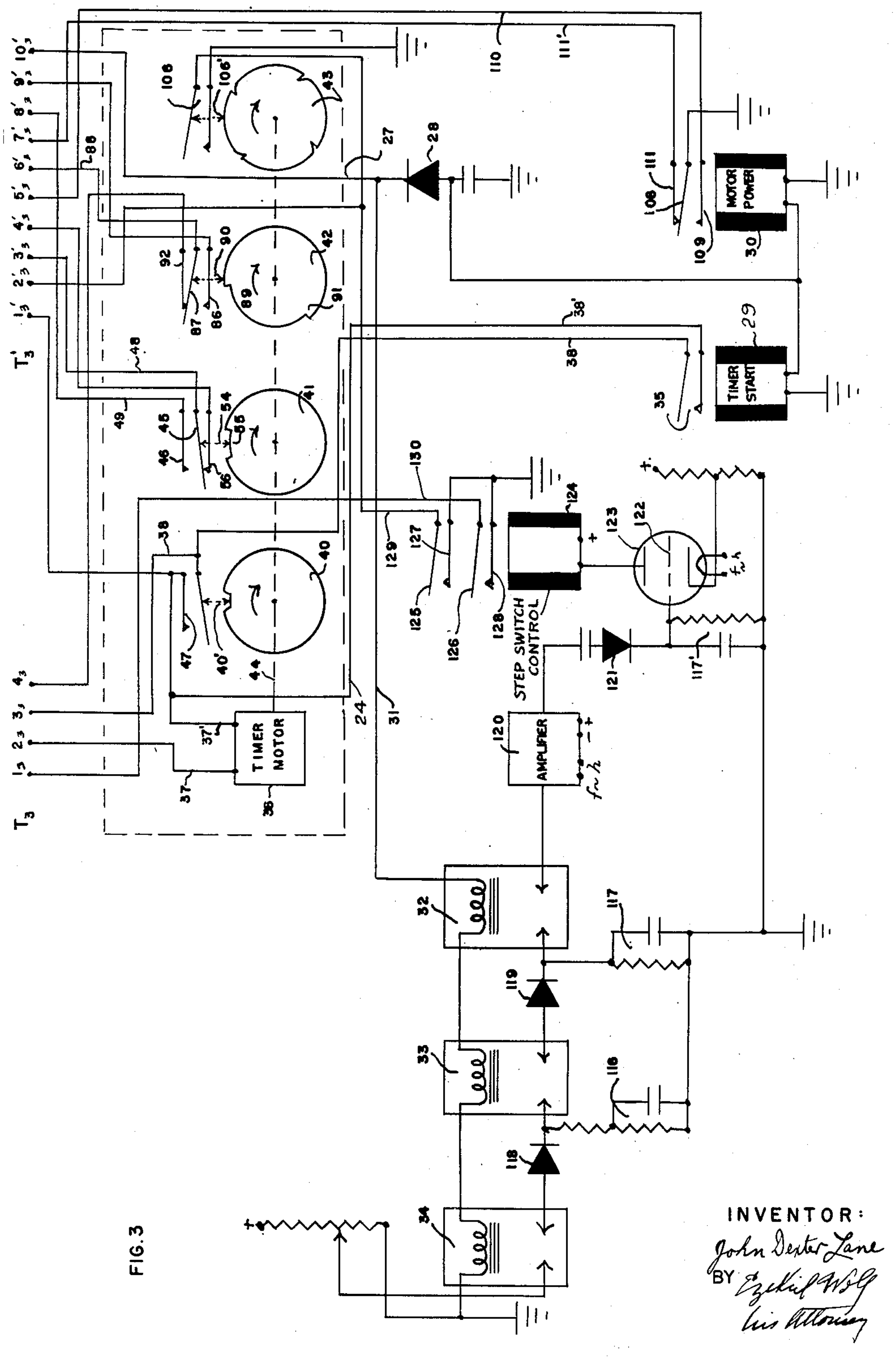
Figure 3 shows a circuit diagram of another portion of the system with one set of terminals related to one of the group terminals of Figure 2 and the other set of terminals related to a set of terminals of Figure 4.

The energy from the band pass transducer amplifier is transmitted to the relay control amplifier 25 which is always operative to the relay power amplifier 26 also always operative over the line 27 which may be traced to the terminal 7 of $T_1$ of Figure 1 from whence it continues over the same line designated 27 in Figure 2 and at the contact 10$''_2$ of $T''_2$ in the lower terminal of Figure 2 which is continued through the circuit of Figure 3 from the terminal 10$'_3$ of $T'_3$ with the same line 27 through a rectifier 28 which converts the alternating current signal to D. C. pulses and operates by this means the relays 29 and 30. Connected to the line 27 just before the rectifier 28 is a line 31 which connects in series to three sensitive tone relays 32, 33 and 34 which are used for a special purpose as will be explained later. While three relays are shown, more or fewer relays may be used, the chief function being to operate individually or separately on a single or substantially single frequency which preferably is in the audio frequency range and is transmitted either simultaneously or in sequence.

The relay 29 closes on a pair of contacts 35 as the result of the ringing of the telephone which thereby energizes the timer motor 36 over the power line 37 and the ground line 38 which is connected by the line 38' to the other side 37' of the timer motor through the contacts 35 of the relay 29.

Figure 4:
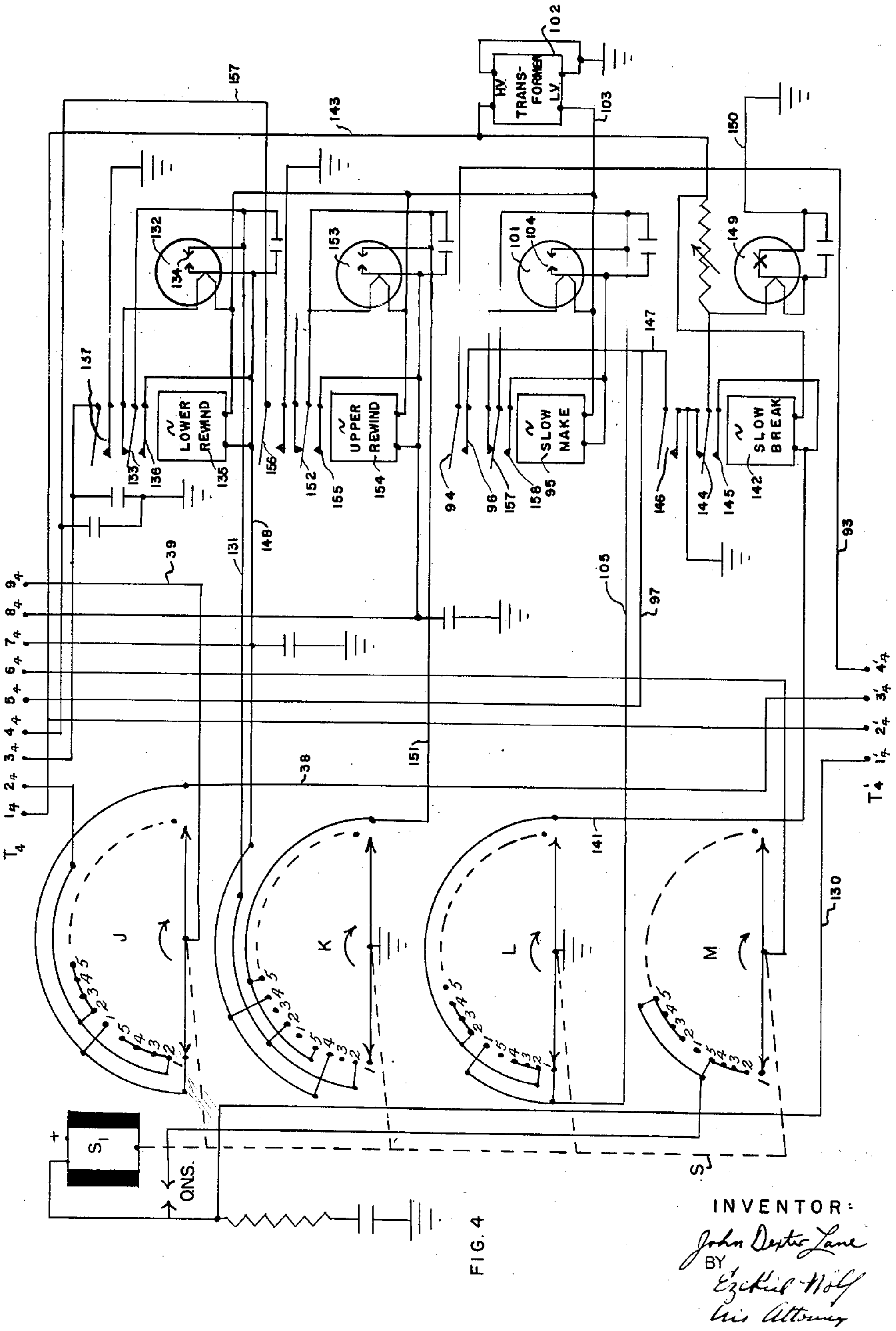
Figure 4 shows a still further portion of the wire diagram of the present invention with one set of terminals related to a corresponding group in Figure 2 and a second set of terminals relating to a corresponding group in Figure 3.

The ground line 38 may be traced through terminal contact $3_3$ of Terminal $T_3$ (Figure 3) to number 1 position on section J of stepping switch S over the line 39 from the rotor of J to contact $a_4$ of $T_4$ to contact 2 of section $B_0$ of the gang switch 1. The stepping switch S is in a normal answering condition in which the rotor arm is on the position 1 as indicated in Figure 4 and is only changed in response to the operation of the timed relays 32, 33 and 34 of Figure 3 under conditions which will be described.

The timer motor is part of a standard timer which is shown in Figure 3 as comprising four timing cams or discs 40, 41, 42, and 43 which are adjustably mounted on the shaft 44 indicated by a dotted line extending from the timer motor.

Since the relay 29 is operated intermittently through the rectifier 28, the timer motor advances correspondingly with intermittent ringing pulses. When the cam 40 has advanced so that the follower 40′ is raised to close the pair of contacts 47, then the timer motor circuit is closed through ground which may be traced to gang switch section B to ground.

Figure 5:
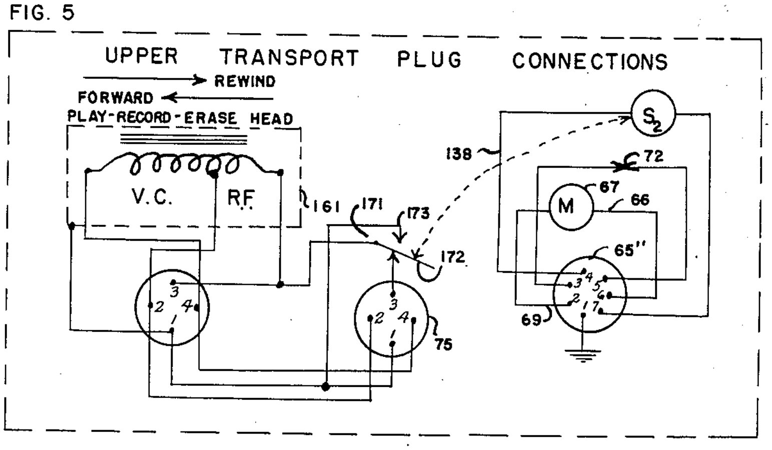
Figures 5 and 5A show similar schematic diagrams for transport plug connections, Figure 5 being named the upper transport and Figure 5A the lower transport plug connections respectively.

The discs advance in the direction indicated by the arrows and shortly after ringing begins, the movement of the disc 41 causes the contact arm 45 associated with the disc or cam 41 to snap to its upper position where it makes contact with the contact 46. Prior to this, the pair of contacts 47 close so that the timer motor is running. The lines 48 and 49 leading from the elements 45 and 46 respectively go to the terminals $3'_3$ and $8'_3$ of Figure 3 and through the terminal boards $T'_3$ of Figure 4. The line 48 goes to contact 50 of the line breaker relay 51 while the line 49 goes to position 2 of the section F of the gang switch 1 whose rotary arm is connected to the line by means of line 170 and section D of the gang switch 1 which serves as the main power switch section. This connection from section D is made by means of the line 52 to the power plug 53, so that by means of the turning of the disc 41 of Figure 3 and making contact between the elements 45 and 46 A. C. power is supplied to the contact 50. The line breaker relay 51 is closed while the timer motor is operated in the stand-by position where the cam arm 54 is in the recess 55 of the disc 41. In this position the arm 45 makes contact with the arm 56 and thereby makes contact across the terminals $3'_3$ and $4'_3$ of $T'_3$. These circuits may be traced to Figure 2, contacts $3''_2$ and $4''_2$ of terminal $T''_2$ over the line 49 to the power supply through the plug 53 as has been previously described and over the line 57, respectively, to the line breaker relay 51. By energizing the line breaker relay, the contact 50 is drawn downward making a connection with the contact 58 and also the contact 59 is drawn downwards which completes the holding circuit for maintaining the line breaker relay energized. This circuit is completed through the line 59′, the normally closed contacts 60′ and 61′ of the relaxation control relay 62′ which is normally as shown in Figure 2. The movement of the cam disc 41 in the direction of the arrow, as has been stated, shortly after the timer motor begins to operate, makes the contact between 45 and 46 which as described, brings current to the contact 50. Therefore, this circuit is then completed through the contact 58 over the line 60 to contact 2 of section E of the gang switch 1 over the line 61 to the contact arm 62 of the change over relay 23 through the contact arm 63 over the line 64 to terminal 6 on the plug 65 of the upper transport wire recorder, the circuit of which is shown in Figure 5 with a corresponding connection 65″.

Figure 5A:
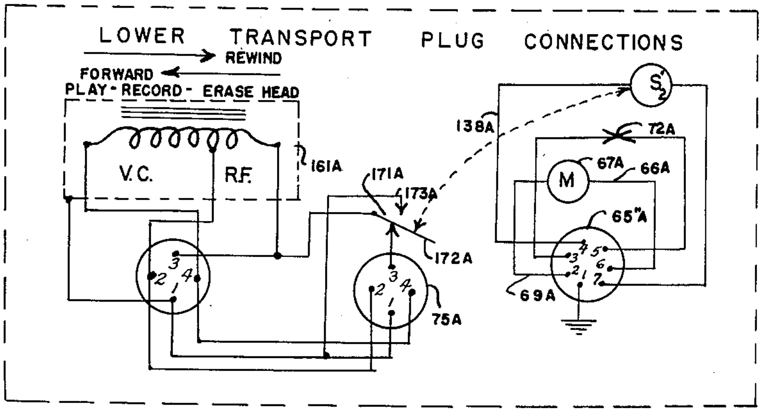

In Figure 2 the plug 65 is indicated for the upper transport. A plug of a similar nature 65′ for the lower transport is shown in Figure 2 and this plug corresponds also to the same connection $65''_A$ as shown in Figure 5A. The motor 67 and the telephone lift solenoid 68 are energized by parallel circuits through the plugs and sockets 65 and 65′ of Figure 2 and their corresponding connections 65″ in Figure 5, $65''_A$ of Figure 5A. The energizing of the motor circuit may be traced from the plug 65′ of Figure 2 as follows. Through the contact 6 of Figure 2 in the plug 65 to the same contact 6 in the plug or connection of Figure 5 through the motor line 66, the motor 67, the line 69, the connection 2 in the plug 65″ to the connection 2 in the plug 65 of Figure 2, the line 70, the line 71, the contacts 2 and 3 in the plug or connection 65′ which is the lower transport plug, the corresponding connection 3 in the plug $65''_A$ of Figure 5A, the circuit breaker 72A which is normally closed except when opened by the travel of the recorder wire to its limiting position, to the contact 5 in the plug $65''_A$ which may be traced to the lower transport plug 65′, Figure 2 at the contact 5 over the line 73 to the contact 3 of the upper transport plug 65 through the upper transport plug 65″ of Figure 5 to the contact 5 of the upper transport plug through the circuit breaker 72 and from the contact 5 of the upper transport plug 65 in Figure 2 through the fuse 74 to the power plug 53.

It is evident from this connection that the line 71 is energized and therefore the telephone lift solenoid 68 is also energized by means of which the telephone receiver is lifted. Mechanical connections for the telephone lift solenoid 68 will be described in connection with Figure 6.

The energizing of the motor 67 of the upper transport begins to run at the same time that the telephone is raised and this motor 67 which starts the running of the telegraphone tape or wire producing the announcement into the transmitter, gives the party at the other end of the line the desired information that is recorded on the tape or wire and thereafter the system is put in operation for reception of any message which the party at the other end of the line may care to give.

Referring back to Figure 1, the connections for the upper transport are shown in the plug 75 which corresponds to the connections or plug 75 which corresponds to the connections or plug 75 in Figure 5. In Figure 5A, the connections or plug 75A also serve diagrammatically for the connections for the lower transport.

From the plug 75 of Figure 1, the announcement signal is carried over the line 76 through a low note boost amplifier 77 to a band pass filter 78 to the play-back gain control amplifier 79 through to the play-back control amplifier 80 and then to the play-back power amplifier 81, the output of which is connected to the electro acoustic transducer 12 which may be any type of loud speaker. It will of course be appreciated that the elements shown in block diagram in Figure 1 may be to a great extent, combined together and also that where it is possible a direct electrical connection may be made to the telephone in place of using an acoustic coupling or energizing element.

In connection with the play-back control amplifier, there is a control or operating relay 82, the function of which will presently be described. There is also in the circuit of the play-back power amplifier 81, a relay 83, which however will normally permit the operation of the play-back power amplifier in position 2 of the gang switch used for telephone announcement and reception.

The circuit for the operation of relay 82 is controlled by means of the line 84 which continues from Figure 1 to Figure 2 over the same numbered line 84 to contact 5 of the gang switch section B and around clockwise of the gang switch section B to the line 85 over the line 85 to the terminal $9''_2$ of Figure 2, $9'_3$ of Figure 3 to the contact 86 on the timer cam section 42. The cam section 42 has progressed from the position indicated in Figure 3 by this time so that the arm 87 makes contact with the arm 86 and the circuit therefore is continued over the line 88 to the contact $6'_3$, connection being traced as continuing to $6''_2$ in Figure 2 to the contact 2 on section C of the gang switch through the rotor of which a connection is made to ground, thereby completing the circuit for the operation of the relay 82.

Upon closing of the relay 82, the play-back amplifier becomes operative. It will be appreciated that in the amplifiers and other units which have been described in the present arrangement and in the units which are to be described that where vacuum tubes are used, these are always mounted in such a state that no time is necessary for them to heat up before they are connected into the operating circuit. This is desirable in the present system but may be dispensed with where the amplifier units or the like comprise elements such as cathodes or the equivalent thereof which do not need to be maintained in a heated state.

The system will continue in its announcement operation for a desired interval depending upon the rotation cycle of the timer motor. This may be of the order of a minute or more depending upon the desired announcement. The timer motor and its timer 24 of Figure 3 shows that the announcement state will continue as long as the cam 42 has its low section 89 in engagement with the cam follower 90. When the cam follower 90 is raised by the high section 91 of the cam 42, then the contact 87 is pushed away from the contact 86 and contact is made with the contact arm 92. The contact arm 92 as indicated in Figure 3, connects with the terminal $4_3$ which connects with the terminal $4'_4$, Figure 4 from which the line 93 connects to the contact 94 of the slow make relay 95. The slow make relay 94 which at this time in the cycle of operation of the system is normally closed as will be shown later and therefore the contact 94 is in a downward position making contact with the arm 96 which connects over the line 97 to the terminal 54 which is traceable to the terminal $5'_2$ in Figure 2, continuing over the same line 97 to the change over relay 23, which thereby operates the change over relay since the contact elements 87 of the cam 42 of the timer is connected to ground or to the other side of the line. The operation of the change over relay 23 draws down both the arms 62 which is the motor power line and the arm 98 which in other positions of the stepping switch energizes relay 22 of Figure 1.

The motor power line is therefore connected to the contact 99 which connects to the line 100 which goes to terminal 6 ot the plug 65′ for the lower transport which causes the lower transport to operate to receive and record, the circuit for which may be traced through terminal 6 of the plug 65″A of Figure 5A to the motor 67A for energizing it.

It should also be remembered that the contacts 87 and 92 of cam 42 open to stop energizing the play-back amplifier during the recording part of the cycle of the timer.

Since the contact 62 is drawn downward the connection to the upper transport through 63 is broken and the upper transport therefore stops. The slow make relay 95 of Figure 4 is normally in closed position when the system is in operation and this is effected through the closing of the thermal relay 101 which impresses power from the transformer 102 over the line 103, the circuit of which is completed through the slow make relay 95, the contacts 104 of the thermal relay 101, over the line 105 through section L of the stepping switch S to the ground in the stepping switch.

The lower transport which receives the telephone message continues to operate while the cam follower is on the high part of the cam 42 up to the point of the termination of the cycle which is the position indicated in the drawing on Figure 3. By this time the cam follower 54 has dropped and following this, the cam follower 40′ of the cam 40 drops opening the contacts 41 to stop the timer motor in stand-by position. The breaking of the contacts between the contact arms 45 and 46 will break the power circuit both to the telephone lift solenoid and to the transport motor power line 61 of Figure 2 and therefore bring the entire system to its original stand-by position with the telephone in the normal position on its cradle. The timer motor during this cycle has returned the discs 40, 41, 42 and 43 to the position shown in Figure 3 under which conditions the timer motor will be stopped since its circuit is broken by the opening of the contacts 47 and further the other cams 41, 42, and 43 will also place the rest of the contacts controlled by their followers in the same position as shown in Figure 3.

The cam 43 has for its purpose to control the production of so-called Beep signals which are required by the Federal Communications Commission to be impressed in all telephone circuits in which messages are recorded so that the speaker on the other end of the line will know that what he is saying is being made of record. For this purpose a pair of contacts 106 are periodically closed every fifteen seconds or at some selected time intervals when the cam 106′ drops down into the recesses in the cam. The circuits through the contacts 106 may be traced from ground to the beep oscillator 107, the connection for which may be traced backwards through the terminal T1 and Figure 2, terminal group T2 and $T''_2$ and terminal group $T'_3$ contact $2'_3$ connecting to the contacts 106.

*Dial tone control*

In the usual telephone system, if a party should call up a telephone number which is equipped with the instrument of the present invention, he may replace the receiver quite quickly, perhaps before the announcement is completed or some time before the whole time for recording is completed.

Under such conditions it is not desirable to have to raise the telephone out of its cradle and maintain it in this position for the complete cycle of the timer motion.

While this condition may arise in the ordinary telephone answering, it may also occur with other types of interruption in the receiving telephone circuit. This may be a lightning storm, an oscillation in the telephone system or most any kind of electrical disturbance having signal level comparable to loud speech in the telephone which will provide an electrical signal by inducing pickup into the electro-magnetic transducer.

In the present invention when this occurs, the cycle of operation ceases and the receiver is replaced on its cradle or hook. The timer motor, however, continues through its cycle so that in effect a time interval is allowed for the telephone system to come back to its normal quiescent state.

The telephone is replaced in the following manner.

The relay 30 which has been previously mentioned is connected in parallel or series with the relay 29 whose function is to provide pulses for starting the timer motor as explained above. The relay 30 is a more sensitive relay and if a dial tone or surge on the line is produced which is not sufficient to provide a ringing, nevertheless, the contact arm 108, Figure 3, will be pulled downward to make contact with the contact arm 109 to ground the line 110. This will also remove the ground from the contact 111 and thereby remove the ground from the grid 112, see Figure 2, in the triode power tube 113 so as to permit the condenser 114 to discharge across the resistance 115 which was not possible when the line 111′ was grounded. As the condenser 114 discharges, the grid 112 becomes more positive with respect to the cathode of 113 permitting after a given constant time interval sufficient to cause the contact arms 61′ and 66′ to separate, thereby breaking the line breaker 51, Figure 2, before the timer motor has completed its cycle. The time constant of the condenser 114 and the resistance 115 is made for a desired time interval which would be less than the time of the timer motor cycle, but greater than a constant continuous sound that would ordinarily be present in speech. In other words, a continuous or substantially continuous sound or corresponding electrical oscillations, signals or noises if sufficiently continuous or persistent as for instance, the dial signal in the telephone, if produced for the given time interval would be sufficient to bring about the operation of the relaxation control relay 62′. The feature also protects undesired interference with the telephone if electrical strays should persist in the circuit. In view of this, while the time constant should not be longer than the cycle of the timer motor it should not be shorter than the ordinary continuous speech sound so that the circuit will not be interrupted while a person normally is speaking. Subsequent to this action by the line breaker relay the timer motor will at the conclusion of the timing cycle come to a stop when the cam follower 40′ rests in the depression in the cam 40.

While it has been previously mentioned that the relay 29, Figure 3, operates by ringing pulses to energize the timer motor for very short intervals, it may also be noted that it is desirable under most conditions to have the space of the depression on the cam 40 sufficiently long so that at least more than one telephone ringing signal is necessary to bring the cam follower 40′ up on the high part of the cam 40. This space will also care for transient phenomena and other spurious signals so that they will not act to start the apparatus.

*Tone answering control*

The relays 32, 33 and 34 have been mentioned. These relays which are unique in the operation of the present system are operated on different substantially single frequencies, either successively or simultaneously to bring about a change on the instrument from its usual sequence of operation in telephone answering and recording to a special operation wherein the timer motor with its cams is brought to rest in a desired position to provide either a play-back of announcements from the transport records or to make the system variable to receive a message which the caller wishes to give. While the resonant relays have each a substantially single frequency which, of course, is preferably different in each case, the system will not be operated by these relays unless the signal for operating the relays continues for a chosen time period as established by the time constant of the condenser resistance circuits 116 and 117 and 117′. In other words, under ordinary circumstances a person's voice or signal may hit the right frequencies of the relays but these frequencies are not normally sustained for such a length of time that while the relays may intermittently continue to operate they will not operate in the proper sequence or for the proper time interval to cause the apparatus as a whole to function as described above. For this purpose a special signal device is used which may comprise a special type whistle, tuning fork or vibrational producer which will provide the correct vibrations for the correct period of time. One of the functions of the band pass compressor amplifier 8 of Figure 1 is to provide such a volume control in the system that the relays may not be operated off resonant frequency or with such an excessive power that they could continue to oscillate for a long enough period of time to operate the system.

Such a signal to operate the resonant relays will come over the same lines as the speech from the telephone system and will therefore come over the line 27, Figure 3, to which the line 31 is connected. The relays are shown as connected in series but may be connected in parallel and their output is rectified by the rectifiers 118 and 119 producing a low potential output which is impressed upon the amplifier 120, the output of which is rectified by the rectifier 121 and impressed as a control potential for the grid 122 of the triode power tube 123 whose output is connected with the relay 124. When the relay 124 is sufficiently energized to pull the contact arms 125 and 126 to the ground connections 127 and 128 respectively, the ground is applied to the lines 129 and 130. The application of the ground to the line 129 will operate the Beep oscillator 107 so as to send a long dash, useful as a system response indicator signal and the ground as applied to the line 130 will operate the step switch solenoid $S_1$, Figure 4, over the line 130 which continues in Figure 4.

The stepping switch solenoid $S_1$ and the stepping switch with its sections J, K, L and M may be of a standard type in which the solenoid $S_1$ moves the rotor contact arms of the sections step by step for each impressed pulse due to closing of the relay 124. Position 1 of the stepping switch is a normal condition and permits the operation of the timer motor for normal stand-by telephone answering as has been described. Position No. 2 of the stepping switch S is the position which the switch assumes after the first operation of the relay 124. In this case the rotor arms are in position 2 on the stepping switch S. In this position of the switch the ground line to the timer motor is opened by opening the line 138 which may be traced through the terminal contact $3_3$ in Figure 3 and $3'_4$ in Figure 4 to the J section of the stepping switch via line 38 which it will be seen is opened when the contact arm has reached position 2. The timer motor therefore stops. It should be remembered however that the cams 40, 41, 42 and 43 are in an advanced position so that the cam followers 40′ and 56 are raised. The cam follower 106′ will also be in a raised position as indicated in Figure 3, while the cam follower 90 may be raised or lowered depending upon the particular type of operation announcing or recording with which the system is provided at the instant. A further operation of the stepping switch in this position is that the relaxation control relay 62′ is made inoperative so as to leave the contact between 60′ and 61′ closed by grounding the grid 112 through the line 111′ the ground of which may be traced from the line 111′ through the terminal contact $2'_2$ on the terminal $T'_2$ to the terminal contact $2_4$ on the terminal $T_4$ to the section J of the stepping switch contacts 2, 3, 4 and 5 which is grounded through the rotor of section J and the line 39 which goes back to the ground on section B of the gang switch. The position of the rotor arm of section J of the stepping switch in all positions 2, 3, 4 and 5 removes the ground from the timer motor thereby opening the motor circuit and also grounds the grid of the tube 113 of the relaxation control relay 62′ which puts this out of action in the system.

Referring now to section K of the stepping switch, the rotor arm will be in position 2, thereby putting a ground on the line 131 which is connected to the thermal relay 132 and to the flipper contact 133 which is in its upper position permitting the heating line to be completed to the thermal elements of the relay 132. The action of these thermal elements may have a delay of approximately five seconds or in that vicinity after which time the thermal unit closes its contacts 134 and completes the ground circuit to the lower rewind relay 135 thereby opening the thermal relay so that it may cool quickly. The lower rewind relay 135 is held closed by the flipper arm 133 making contact with the lower contact 136. Simultaneously with the pulling down of the flipper 133, the pair of contacts 137 is closed to ground. The grounding of this puts a ground on the terminal contact $3_4$ of the terminal line $T_4$ which corresponds to $3'_2$ of the terminal $T'_2$ from which the connection may be traced to the plug connection or plug 65′, the point marked 7 therein, which may be seen from Figure 5A, at the plug 65″, connects with the solenoid $S'_2$ which is thereby energized, since the line 138A connected to the solenoid $S'_2$ goes to the terminal 4 in the plug 65″A and then goes through the corresponding terminal 4 in the plug 65′ of Figure 2, the connection for which goes over the line 139 to the ungrounded side of the isolation transformer 140.

The solenoid $S'_2$ is part of the transport system and pulls in to engage the rewind pulley train which is commonly used in standard transport systems but not shown in the drawings. The transport motor is controlled through section L of the stepping switch S in positions 2, 3 and 4 of the rotor arm. When the rotor arm is in either position 2, 3 or 4, the arm is grounded which will ground the line 141 connected to the slow break relay 142, the other end of which may be traced over the line 143 to terminal contact $1_4$ on the terminal $T_4$ and through the contact $1'_2$ on the terminal $T'_2$ to the isolation transformer 140 from which it is energized. The holding contacts comprise the flipper arm 144 and the contact 145 which are closed immediately upon energization of the relay 142. Likewise the upper pair of contacts 146 are also closed putting a ground on the line 147 and on the line 97 which will ground the change over relay 23, Figure 2, as has been previously explained. The action of operation of the change over relay 23 as has been previously described, will energize the lower transport motor 67, Figure 5A, and will therefore drive the lower transport forward. Contact 98 is pulled down when change over relay 23 is energized and causes relay 22 and relay 80 to operate simultaneously to permit play back from the lower transport to 12.

It should be noted that while the stepping switch S in all of its sections moves simultaneously so that the slow breaking relay 142 will operate before the lower rewind relay 135 so that the transport motor will be in operation before the rewind solenoid $S'_2$ is operated under which conditions, when the rewind solenoid pulls in the motor will already be up to speed.

It should also be noted that the transport during the period of operation of the motor and before the rewind solenoid operates, drives the transport in a forward direction so that actually the listener at the other end of the line will hear what may be already recorded on the transport before the change over is made. Where the tone control operation is only used by the station proprietor, that is the person who is the telephone subscriber, the recognition from the play-back for the short interval necessary to change over to rewind, will indicate to him how many messages he approximately has on the lower transport record. After the rewind solenoid has operated, the operator at the other end of the line will permit the rewind to continue as long as he desires. He may stop it wherever he likes by again keying the system by operation of the resonant relays. He may wish to operate the resonant relays at a point of the rewind which he recognizes is the beginning of some new messages which he has not already heard which may be recognized by different characteristic sounds or he may permit the rewind to continue until a certain silent spot has been reached which is the start at which records on the lower transport begin. In either case actuation of the resonant relays 32, 33 and 34 will step up the stepping switch S from the position 2 to the position 3.

In the position 3 of the stepping switch, similar conditions exist as in position 2 for sections J, L and M of the switch. In section K however, the contact to the lower rewind relay 135 is broken so that the rewind solenoid $S'_2$ releases permitting its clutch in the transport controlled by it to throw over to a play- or run-forward position for the lower transport unit, in which case the transport plays back the messages it has recorded on its wire or tape through the electric acoustic transducer 12 which may be acoustically or electrically coupled to the transmitter in the telephone system. This circuit has been previously substantially traced in other operations of the system.

After the operation of the rotor arms in the stepping switch on position 3 has been completed by play back all messages to the listener on the other end of the telephone line, he may again key the system by operation of the resonant relays 32, 33 and 34 to move the stepping switch S to the next position 4 of the rotor arm of section J, K, L and M.

Section J, section L and section M remain the same as far as the circuit is concerned in previous positions other than position 1. The rotor arm of section K however on position 4 puts a ground connection on the line 148 which again energizes the lower rewind relay 135 without any delay action of the thermal switch 132. The lower rewind relay again as previously will operate the rewind solenoid $S_2$ throwing the lower transport into rewind position under which conditions the transport may be rewound at the discretion of the operator. If he wishes to preserve the messages already on the record he may do so by quickly passing through position 4. In fact, if he desired to preserve every bit of record on the lower transport it would be wise for him in position 3 to permit the play back to run slightly beyond the last message to allow for delays in the circuit before the change over of the rewind solenoid takes place.

In position 4 as has been stated, the lower transport runs in rewind and by again keying the system by operation of the resonant relays 32, 33 and 34, the stepping switch S will be shifted from position 4 to position 5. In position 5, sections J and M of the stepping switch have the same circuit connections as previously except in position 1, but sections K and L are different. In section L the ground is removed from the line 141 which goes to the slow break relay 142 and thereby opens the circuit after the time interval controlled by the action of the thermal relay 149. The thermal relay 149 is normally closed under cold conditions but when the ground on the line 141 is removed then the relay 142 remains connected to the ground 150 through the thermal switch which is sufficient to maintain contact to flipper 144 and the connection 145, until the thermal relay 149 heats and opens in which case the slow break relay contacts are released and the circuit is broken both to the line 147 and to the slow break relay 142. Flipper contact 144 is however immediately closed to ground shorting current around thermal relay 149 keeping its contacts closed. In breaking the line 147 the ground to the line 97 is opened and the change over relay 23, Figure 2, becomes deenergized so that the contacts are in the upper position as shown in Figure 2. This will cause the upper transport motor to run again and get up its speed while other delayed relays are getting ready to operate. Getting back to section K of the stepping switch S for condition where the rotor moves from position 4 to position 5, when the rotor leaves position 4 the lower rewind relay is immediately opened changing over its relay contacts thereby changing over the rewind solenoid $S'_2$ for the lower transport from a rewind condition to a run forward condition. As the rotor arm of section K reaches the contact 5, the line 151 is grounded which connects to one side of the thermal relay 153 and to the flipper arm 152 of the upper rewind relay 154. This heats the thermal element of the relay 153 closing with a desired time delay, contacts of thermal relay 153 which thereby permit the relay 154 to be energized and close the holding contacts between the flipper 152 and the contact 155. This operation of the relay 154 pulls down the contact 156, grounds the line 157 which may be traced through the contact $4_4$ on the terminal $T_4$ through the corresponding number on the terminal $T'_2$ to contact 7 on the upper transport plug 65 which corresponds to the plug 65″ of Figure 5 and may be traced through the plug 65″ which is used now as a reference to the upper transport connections. The operation of the solenoid $S_2$ will begin the rewind of the upper transport but this will not occur until a time interval which may be two seconds or more after the opening of the slow breaker relay 142 for stopping the lower transport. The purpose of this is to permit the lower transport to come to a stop and also to delay the operation of the rewind solenoid switch $S_2$ for the upper transport so that the upper transport motor will be run at full speed when the change over is made. In position 5 of the stepping switch, the upper transport which carries the announcement messages may be rewound to any desired position and if desired to a signal or space indicating the very beginning of the upper transport record so that the full sequence of announcement messages may be reused.

After the operation of Figure 5 has been completed the resonant relays are again operated to shift the rotor arms of the stepping switch to normal position No. 1 which is the position of the original normal stand-by conditions shown in Figure 4 wherein the timer motor again takes over control of the operation of the system.

Section J of the stepping switch moves from position 5 to position 1 and thereby connects the rotor of the section J through the line 38 to the flipper contact of the cam section 40 of the timer motor and if the cams are not in the position shown in Figure 3 which is usually the case after the operation of the stepping switch, then the connection with contact 47 is made and a ground circuit through the timer motor is completed through line 39 to section B of the gang switch 1, Figure 2, and of course the timer can again run to recycle position.

When the rotor arm 1 is removed from contact 5 on section J then the ground is removed through contact $2_4$ on $T_4$ and $2'_2$ on $T'_2$ through the line 111' on the relaxation control tube grid 112. This will put the dial control protection circuit in operation which circuit has been previously explained.

In section K of the stepping switch, shifting from position 5 to position 1 breaks the ground connection to the line 151 thereby immediately upon the upper rewind relay 154 which shifts the upper rewind solenoid switch $S_2$, Figure 5, from rewind to run forward position.

The upper transport motor is also stopped, but this is stopped a short interval after the operation of the upper rewind relay since it is stopped as the result of the slow make relay 95 becoming energized through the section L of the stepping switch as the rotor arm makes contact with position 1 and again grounds the line 105. The slow make relay 95 will close slowly approximately two seconds after the rotor arm reaches the contact 1. This delay is obtained because of the necessary heating in the thermal relay 101 to bring together the contacts 104 through which the relay circuit is never completed before the connection is made from the flipper 157 to the contact 158. The closing of the slow make relay brings together the contacts 94 and 96 which puts the cam section 42 of the timer motor into control for running either the upper or lower motor into control for running either the upper or lower motors depending upon the position of the cam.

The section M of the stepping switch has not been previously discussed. The function of this section M of the stepping switch S is to lock out the influence of the resonant relay control operation or any operation which might actuate the stepping switch from normal position 1 provided that the gang switch 1 of Figure 2 was in a position other than the off position No. 1 and the stand-by and telephone answering position, No. 2. This is accomplished through the auxiliary contact ONS which if grounded will recycle the stepping switch from any position to position 1 of the stepping switch rotor which is the normal position. This ground is provided by section H of the gang switch 1 in all but positions 1 and 2.

In Figures 5 and 5*a* for the upper and lower transport plug connections respectively, switches 171 and **171*a* are shown with flipper arms 172 and 172*a* respectively. These flipper arms are operated in connection with the rewind solenoids $S_2$ and $S'_2$. These rewind solenoids are energized for rewind as has been previously mentioned and are released for play or record conditions to permit the transports to run forward. When the switches 171 or 171A are operated for rewind, that is when the rewind solenoids are energized, the contacts 172 and 172*a* respectively are operated to move them to their upper positions for contacting the ground lines 173 and 173*a*** respectively under which conditions the play-record-erase head will not be energized by an erase signal and the record on the transport will remain intact.

In the use of the tone keying device, it has been previously noted that in positions 2 and 4, the lower transport is rewound and in position 5 the upper transport is rewound as a part of the operation of the tone keying control. It has also been mentioned that the circuit breakers **72*a* for the lower transport and 72 for the upper transport are broken as the tape or wire approaches the end of its travel on the spools and when this occurs not only is the transport shut down but the entire system shuts down since the circuit breakers 72 and 72*a*** are in series with each other and with the main power line.

It will also be obvious that since the transports run both ways, that the circuit breakers 72 and **72*a*** which are in series with each other may be opened at either end of either of the tapes or wires on the spools of the upper and lower transports so that the whole system may actually be shut down in positions 2, 3, 4, or 5 of the stepping switch.

It has also been pointed out above that in positions 2 through 5, the timer motor remains unenergized so that the cams 40, 41, 42 and 43 respectively are in a position at a different angle of rotation from that shown in Figure 3. With the cams in such a position a failure in the main powered supply will completely shut down the whole system and while under other circumstances where the stepping switch is in normal position 1, the timer motor will take over immediately when the power goes on and recycle the system to the normal stand-by position. This will not occur with the stepping switch in positions 2–5.

The operation of the system up to the present has been described with the gang switch in position 2 and it has been explained that this is the position for stand-by answering telephone calls and it has been shown in the above description not only how the system operates for normal announcement, reception and recording of messages, but also how a person is able to call up and listen to the messages which have been previously recorded. It should be remarked in this connection that the play-back of the record of all previous messages is operative only in response to operation of the resonant relays. This will not be available to any caller but only to the telephone owner himself, who of course will have available means for producing the operation of the resonant relays in their proper sequence in operation. The owner or party having the suitable tone keying device may of course record a message up to the capacity of the transport.

Operation of the stepping switch has been discussed only in announcement position of the timer motor cams 40, 41, 42, and 43. The stepping switch may be operated in any position of the cams. In the recording cycle position which is when the cam follower 90 of cam 42 makes contact between 87 and 92. In position 3 of the stepping switch under these conditions, a message of the complete wire length may be recorded on the lower transport. If the operator wishes to hear the messages in the lower transport before he records his own message, he will operate the stepping switch by tone keying in the announcement cycle of the timer cam 42 and then recycle the stepping switch to normal position 1 and wait until the timer motor advances the cam 42 to the record cycle.

The particular arrangement for operating these resonant relays will of course be such as to provide secrecy for the operation of the system. Such secrecy may be obtained by having answer time interval as well as a particular sequence of frequencies or by some suitable combination which may readily be obtained.

When the gang switch 1 is changed from 2 as indicated in Figure 2 to position 3, the apparatus is in a position to record a complete telephone conversation between two parties, one away from the apparatus and one at the apparatus.

In the third position of the gang switch in Figure 3, the telephone record is made on the lower transport. With reference to the gang switch connections, section A in position 3 retains the same connections as in position 2, namely connecting the line 6 to ground. This as has been previously explained energizes the relay 4 which puts into operation the telephone pick-up preamplifier 3. The signal received by the electro-magnetic transducer 2 passes through the telephone pick-up preamplifier 3, the band pass compressor (automatic volume control amplifier 8) over the line 19 to the recording isolation amplifier 20.

The signal is passed on as in the case of recording in the position of the gang switch 2 through the high note boost amplifier 159 to contact 4 of the lower transport plug 75A and to the corresponding plug 75A, contact 4 of Figure 5A and connecting play-record-erase head 161A. A recording level indicator 162 which is visible from the front panel of the instrument shows the level of speech intensity so that the operator at the station will know that the voice received has been sufficiently amplified.

In section B of the gang switch 1, the ground 39 is opened when the contact arm moves to section 3 which opens the line 39 to ground to one side of the timer motor. This will prevent the recycling operation action of the cam 40. In section C of the gang switch, ground is placed on the contact 3 and the line connecting to it, 163, goes to 1″2 of the terminal T″2 and from 1′3 of T′3 of Figure 3 to the timer motor 36, directly thereby permitting the timer motor to continue operation but not on a recycling program.

The purpose of this is to permit the timer motor 36 to continue to run to provide periodical beep signals while recording by means of the cam 43 keying the contacts 106 with the cam follower 106′.

Section D of the gang switch is the main power line which has been previously described and is on in all of the positions of the gang switch except in off position 1 of the gang switch. This section D of the gang switch does not interrupt connections as the rotor arm changes its position but maintains contact during the change over from one position to another position on the section of the gang switch.

In Section E, the contact 3 is an open contact so that the movement away from the contact 2 will open the circuit to the line 60 of the contact 58 of the line breaker relay 51 so that no circuit may be completed when the flipper arm 50 is drawn down to the contact 58. This eliminates the action of the cam section 41 of the timer motor which it is remembered is in operation.

In section F the power connection to the line 49 is broken and transferred to contact 3 of the section F which places power on the motor contact 6 of the plug 65′ of the lower transport. Opening the line 49 further removes action of the cam section 41 on the upper contact segment 46 of cam 41 of the timer motor. Terminal No. 6 on the lower transport plug 65′ corresponds to a similar plug 65″A on the lower transport motor which connects to the motor 67A of the lower transport and completes a circuit through the line 69A as has been previously described. The lower transport motor is therefore running in forward position to record any speech received in the system.

In section G of the gang switch 1, the movement of the rotor arm disengages contacts of the relay 30 and connects a ground to the line 111′ of the grid 112 of the relaxation control relay 62′ which thereby keep the relay inoperative.

Section H as has been previously described, locks out the stepping switch S and section I remains in the same relative inoperative position as in Figure 2.

The automatic volume control of amplifier 8, Figure 1, in this position 3 of the switch acts to equalize the relative speech intensities of the speaker at the station with the speaker at the far end of the line.

It may also be remarked here that the volume control amplifier 8, which as the legend indicates in Figure 1, is provided with a band pass filter for elimination of certain undesirable frequencies which often appear in telephone systems, such for instance as a sixty cycle hum and ultrasonic frequencies of a sustained or intermediate character which among other things may be used for erasing of the records on the transports.

The gang switch from position 4 through to and including position 11, acts to maintain the telephone pick-up disconnected from the rest of the system because section A of the gang switch removes the ground from line and deenergizes the relay 4, thereby preventing any signal in the electromagnetic transducer 2 from going into the rest of the system. Other telephone control circuits previously made inactive in the position 3 remain inactive in position 4 and in all other positions 5 through 11 of the gang switch.

When the rotor arm of contact A reaches position 4, the line 14 goes to ground and thereby energizes relays 11 and 10 to make the electro-acoustic transducer act as a microphone and connects it to the sound pick up pre-amplifier 9 which is energized by contacts on relay 10 being closed.

In place of a microphone for providing speech or signal energy in the electro-acoustic transducer 12, any other means of imparting energy to the sound pick-up pre-amplifier may be used whether produced by sound or other radiant energy means.

The sound pick-up pre-amplifier 9 is connected in circuit with the band pass compressor amplifier 8 and the circuit from there on over the line 19 is the same as previously described in connection with the switch on position 3. As both relay control amplifier and the relay power amplifier are energized as in other positions of the gang switch, the signal of the sound pick-up pre-amplifier is carried over the line 27 which is connected through to Figure 3 to the rectifier 28 and energizes intermittently according to speech or other signal, the motor power relay 30. This action will pull down the grounded flipper 108 to the contact 109 and as previously described, putting a ground on the line 110, connection for which may be traced through section G of the gang switch 1, contact 4 through the rotor arm and to the line 111′ so that a ground will intermittently be placed upon the grid 112 of the control tube 113 of the relaxation control relay 62′ thereby intermittently opening with a time delay the contact 60′ and 61′ dependent upon the time constant of the circuit involving the condenser 114 and the resistance 115 as has been previously explained.

It will be noted that the operation of the relaxation control relay 62′ is exactly the same as previously described, but that in the case of the gang switch in position 4, the relay 62′ is operated in a reverse manner through the relay 30, Figure 3. That is when a period of silence occurs, the relay 30 will let go and if it continues for a time constant equal to the time constant of the condenser 114 and the resistance 115, the relay 62′ will operate and shut down the operation of the motor power lines.

The position of the rotor arm of section B of the gang switch on contact 4 will put a ground on the change over relay 23, Figure 2, to pull its contacts down which completes connection to the power lines for the lower recorder motor 67A. In section C of the gang switch the rotor on the position of contact 4 will remove the ground on the line 163 previously mentioned as controlling the running of the timer motor.

D has already been described in all positions.

In the sections E of the gang switch, the rotor on position 4 connects from the line 61 of the change over switch which is in its down position through contact 4 of section E and over the line 164 to the flipper 60′ which makes contact through the line 165, to the common power line 170. This circuit therefore provides power over the line 100 to run the lower transport motor through the plug connection 65′ as previously described.

When the rotor arm of the gang switch 1 is in position 5, of all of the sections of the gang switch, the device is set up for play-back of sounds recorded on the lower transport whether transmitted over the telephone system or through the electro-acoustic transducer 12. The sound may also be passed through the typist control block 174, Figure 7, which appears similarly on Figure 2. Contact 5 in section A puts a ground on the change over relay, thereby operating it, thereby closing the contacts to run the lower transport motor. This is cared for through section E of the gang switch, the rotor of which is connected to the flipper 62. Section E of the gang switch has the same power line connections in position 5 as in position 4, being controlled through the relaxation control relay.

In section B contact 5 puts a ground on the relay 82, Figure 1, to make the play-back control amplifier 80 operative and to permit the amplified sound to pass through the amplifier 81 and the electro-acoustic transducer 12. The energy to the amplifier 80 comes through play-back gang control amplifier 79, the band pass filter 78, the low note boost amplifier 175 which connects to terminal 4 of the plug 75A of the lower transport.

The plug 75A on Figure 1 corresponds to the similar numbered plug in Figure 5*a* and the connections are such as to impress the signal from the voice coil V. C. on the circuit which has just been traced.

The gang switch C in position of Figure 5 may be traced as connecting through contact $1_2$ of terminal $T_2$ to contact at 1′ of terminal T′ and through to the relay 22 thereby energizing this relay through completing the ground connections. Energizing of the relay 22 draws down the flipper contacts 176, 177, 178 and 179. Contact 176 when drawn downward connects the negative side of the low note boost amplifier 175 to ground thereby placing this amplifier in condition for operation. The contact 177 may be traced through the tap on the coil of the erase head in the lower transport 161*a* placing this point at the same ground. The use of the contacts of the other half of the relay 22 will be explained later.

Section D of the gang switch controls the main power supply and this has the same connections for all positions except position 1.

Section F has no utility in position 5.

The rotor arm of section G has the same connections in position 5 as in position 4.

The rotor arm of section G in position 5 connects with the line 180 which goes to the contact 181 which is connection to ground when the movable arm 182 of the volume control 183 is moved to the upper position in the figure which is the maximum volume condition. In this connection of section G of the gang switch, the grid 112 is grounded so that the relaxation control relay 62′ remains as shown in Figure 2. The volume control line 184 connects to contact 5 of section I of the gang switch which goes back through line 185 contact $4_2$ of $T_2$, $4_1$ of $T_1$ to the playback gang control amplifier so that this volume may be regulated by the position of the arm or dial 182 which appears on Figure 8 on the front panel of the apparatus.

Figure 7:
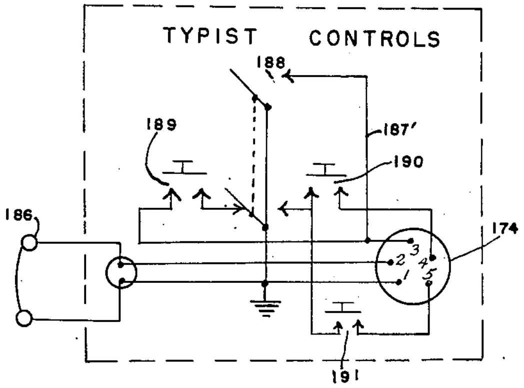
Figure 7 shows a detail of a typist control in connection with the present system.

It will be noted from the description above that in position 5 of the gang switch, the lower transport device is connected both to the electro-acoustic transducer to produce the sound and also to the telephone head set 186 of the typist control shown in Figure 7. This may readily be traced through the corresponding plugs 174 of Figure 7 and Figure 2 respectively and over the line 187 which ultimately goes to the play-back power amplifier.

In order to have the message taken down on the typewriter, the typist is provided with a control so as to be able to stop the transport as well as may be necessary for proper typing. In the plug 174, the connections labelled 3 on Figure 2 connects directly with 111′ and this on the typist control has one line 187′ with the double pole double throw switch 188 by means of which the line 187′ may be grounded either directly or through the push button switch 189.

If the volume control has not been put in its maximum position as is ordinarily the case when a typist is listening through the head phone, then the line 111′ to the grid 112 is controlled through the switches 188 or 189. If the switch 188 is closed to the line 187′ then the grid is grounded and the relaxation control relay 62′ remains in the position shown in Figure 2, so that the lower transport will continue to operate without any interruption. If on the other hand the switch 188 is in open position as shown in Figure 7, then the relaxation control relay 62′ will be maintained with the contacts in position shown in Figure 2 only when the switch 189 is loosed. In fact, due to the time delays in the time delay circuit of the tube 113, the transport ordinarily will run for about ten seconds after the ground has been removed from the grid 112 or after the switch 189 is opened so that intermittent operation of the switch 189 can be made to keep the transport moving along continuously or intermittently in the manner in which the operator desires it to be controlled.

If the switch 188 is closed to the line 187′, then when the push button switch 190 is closed through ground to the point 4 on the plug 174 corresponding to the same point on the plug 174 of Figure 2, the line for which goes to the contact 7 of the lower transport plug 65′ which operates the rewind solenoid $S'_2$ and thereby switches the lower transport from forward travel to rewind so that if the operator has lagged behind her transcript of the message, she can in this way turn the transport back so that she may repeat again the operation of the message which she has missed. On release of the switch 190, the solenoid $S'_2$ will be released and the lower transport will go forward to give back the message to the typist.

It can also be shown in the system that the typist controls namely the switches 188, 189, 190 and 191, do control the motors and the rewind solenoids so that the transports can be wound or unwound practically at will.

With the rotor arm on position 6 of the gang switch, the lower transport is rewound with audible monitoring, that is the loud speaker or electro-acoustic transducer 12 is connected so that the rewind sound from the lower transport will be transmitted from this unit. The circuit conditions are the same as for the conditions of the circuit with the gang switch in position 5, except that the lower transport is made to rewind by energizing the solenoid switch $S'_2$.

In this case section I connects to an auxiliary volume control 192 which is pre-set to give a low play-back volume under this switch position so that while the rewind noise will be heard it will be of low volume.

In position 7 of the gang switch, the upper and lower transports are both operated one for playing and one for recording so that signals or messages may be transferred from one to the other. Sounds in this case are played back from the lower machine and recorded on the upper machine although by a similar set of connections the reverse arrangement may be obtained. This reverse condition is obtained in position 8 of the gang switch. Positions 7 and 8 will be considered more in detail.

With the gang switch in position 7, section C of the gang switch has its rotor connected to ground and this as has been previously traced will energize the relay 22 which operates the switch 176, 177, 178 and 179 to connect the lower transport through to the play-back control amplifier 80 from which the energy will be fed over the line 193 and through line 19 on to the upper transport as has been previously traced.

Section A of the gang switch connects the relay coil 83, Figure 1, to ground through contact 7 and also through contact 8 so that the operation of feed back control relay 83 completes a feed back coupling by means of line 193 from the playback amplifier 80 to line 19. Section B of the gang switch insures through the connection 84 the operation of the relay 82 so that the play back control amplifier is operative.

Section E maintains the power on the motor of the upper transports through the line 165 and section F maintains power on the lower transport motor.

Section G maintains a ground on the relaxation control relay 62′ to maintain this paralyzed.

Section H has already been described.

Section I taps in the master volume control, the operation of which has already been explained. In this case it will be used in connection with the recording level indicator 194 to show when the volume for recording is at the proper intensity. While the signal is fed from the play-back control amplifier 80 over the line 193, some of the signal goes through the play-back amplifier 81 and is heard in the electro-acoustic transducer 12 so that an indication of the input energy on the upper transport is obtained both for the audible signal as well as by the recording level indicator.

In the gang switch in position 8 which is the reverse of position 7, the record is transferred from the upper transport to the lower transport in exactly the same way as has been previously described. In this hookup the signal is likewise audible on the electro-acoustic transducer and the recording level indicator 162 indicates the level or magnitude of the recorded signal.

The change over from position 7 to position 8 is effected by the release of the relay 22 which permits the flipper contacts to fly upwards for completing the circuits which have been described above.

In the down position of the flipper contacts 176, 177, 178 and 179 the lower transport head is connected through amplifier 175 outward to other play-back components, and amplifiers 20, 159 and the ultra-sonic erase oscillator 205 remain deenergized. Also in this position recording isolation amplifier 21, high note boost amplifier 206 and ultra sonic erase oscillator 207 are energized to record. Flippers 176 and 178 are used in both up and down positions to maintain a ground for the common R. F. and V. C. lines on the upper and lower transport.

In the upper position the lower transport head is coupled with associated amplifier 20, 159 and ultra sonic erase oscillator 205 which are energized for recording while the amplifier 175 remains deenergized. The upper transport head in this position is connected for playing with its associated amplifier 77 energized while 21, 206 and 207 are deenergized.

Position 9 of the gang switch is used for rewinding the upper transport at the same time providing an audible monitoring at a low volume. This is a similar arrangement as for position 6 of the gang switch wherein the lower transport rewinds with audible monitoring at a low volume.

In position 4, for the gang switch, which has been previously described, recording was done on the lower transport. In position 10 the same kind of recording may be done on the upper transport with all of the other control features which were obtainable in the position 4 of the gang switch.

Position 11 for the playing of the upper transport corresponds to position 5 for the playing of the lower transport and this may be accomplished with the same control features for the playing of the lower transport in the fifth position of the gang switch.

In view of the fact that the circuits of the present invention are quite complex and in order to avoid confusion and to keep this specification as reasonably short as possible, I have avoided tracing out fully and completely all of the circuits and the connection of the various elements in their various relation one to the other. However the analogies of the switches in one position and the operation of the elements of the apparatus can readily follow from this in other positions which have been more fully described.

The purpose of the system as a whole is to provide in one apparatus not only a complete telephone answering service, but also all other desirable features which might be useful or necessary in connection with recording and repeating signals or any other intelligence both locally by the operator himself or from a distance over the telephone lines.

It may be well to describe more in detail the purposes and utility of positions 7 and 8 of the gang switch in which a message may be transferred from one transport to the other transport in connection with transferring a message from either transport to the other and simultaneously listening to the message being transferred.

The operator who is in control of the gang switch can move the rotor arm quickly to any position which he desires. He may therefore record a message either through the phone, the lower transport or through the electro-acoustic transducer on either the upper or the lower transport. In position 4 the speaker will record a message on the lower recorder. In position 10 he will record a message on the upper recorder. If he desires he may combine parts of messages from the lower transport with those of the upper transport on either one or the other records. He may in fact make a rough composite on one recorder and then transfer it for a smoothly reading record on the other recorder.

Positions 7 and 8 may be used to play a record and simultaneously record the same on the other transport. Other positions of the gang switch may be used in combination with 7 and 8 to add or delete parts of any recording and to transpose or rearrange parts of the record.

An important improvement in the present system is that if parts of the record are to be combined, they may be combined entirely through the normal operation of the machine and not by other means which were previously commonly used, as for instance by splicing records together, or by cutting out sections which were to be deleted.

Referring to some of the details in the switch diagram, it will be noted that in the gang switch 1, sections D, E and F show a rotor arm with an enlarged contact end. This contact end is intended to be wider than the space between successive contact positions so that the advance contact is completed before the rear contact has been left so that a new contact is always made before the old contact was broken.

It will be noted that the terminal T1 of Figure 1 corresponds to the terminal T2 of Figure 2 and that the terminal $T'_2$ corresponds to the terminal T4 in Figure 4, while the terminal $T''_2$ corresponds to the terminal $T'_3$ in Figure 3. Also the terminal $T'_4$ in Figure 4 corresponds to the terminal T3 in Figure 3. These terminal contacts are rearranged in this fashion so that the circuits may be readily traced through from one figure to the other.

In the case of Figures 5, *5a* and 7, the connections for these figures correspond to corresponding numbered figures in Figure 2 with the exception that the upper transport plug 75 in Figure 5 corresponds to 75 in Figure 1 and the lower transport plug **75*a*** in Figure *5a* corresponds to **75*a*** in Figure 1.

Figure 6:
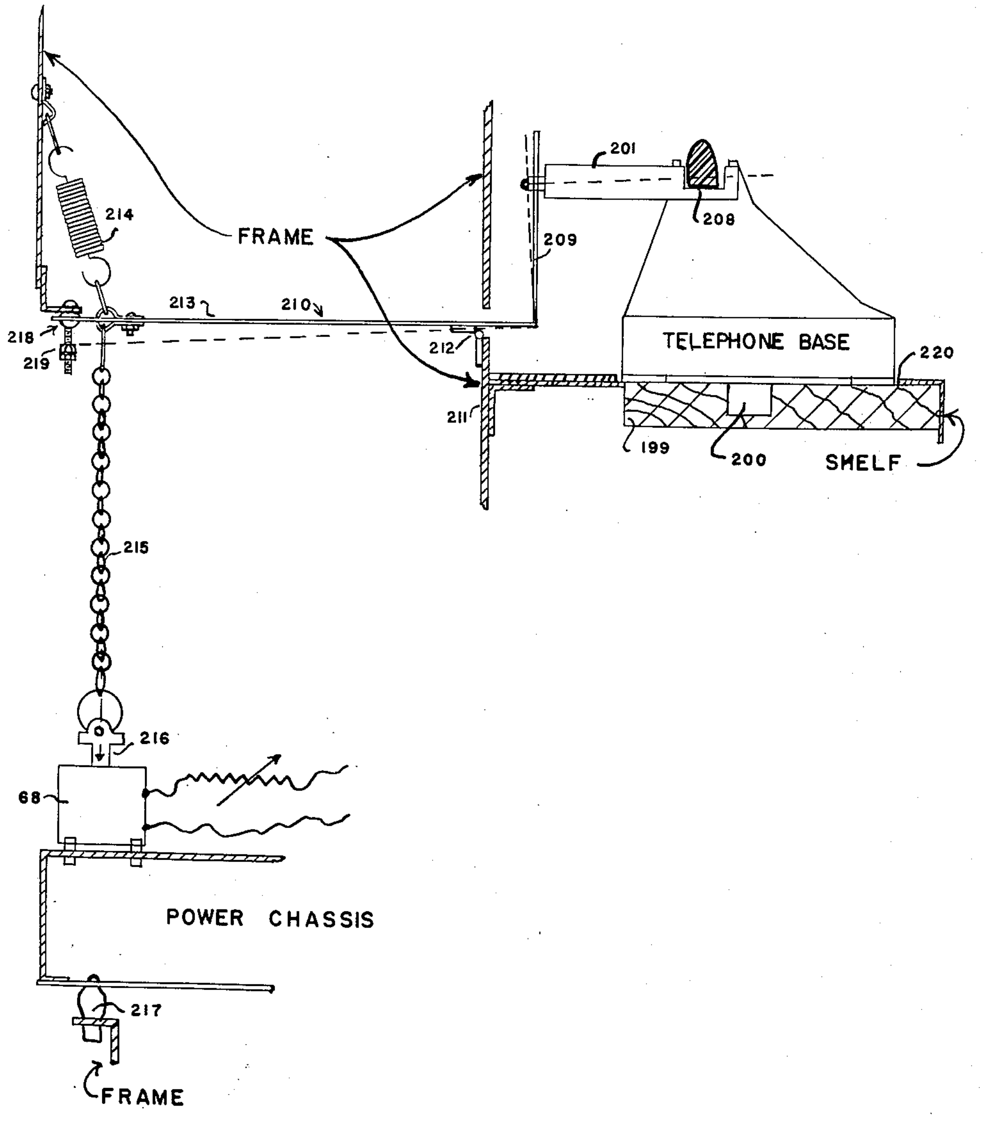
Figure 6 shows somewhat schematically the mechanical coupling arrangement for lifting the telephone hand set off of its cradle.
Figure 8:
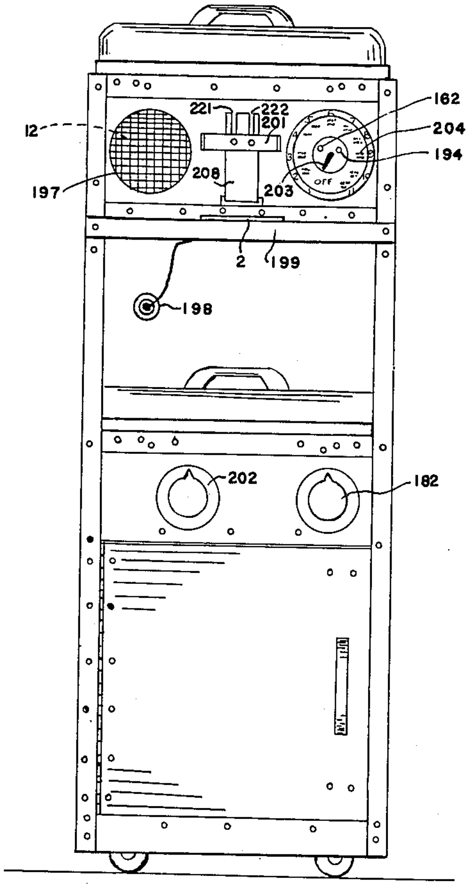
Figure 8 shows an external view of the cabinet in which the apparatus is contained.
Figure 9:
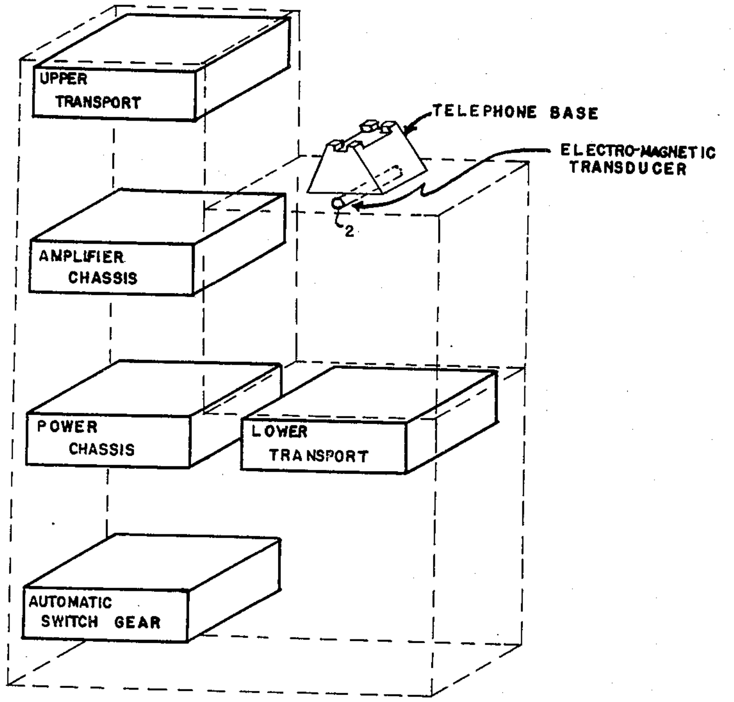
Figure 9 shows a schematic diagram of the arrangement of the internal elements within the cabinet of Figure 8.

Figures 6, 8 and 9 have not as yet been referred to. These show some of the details of the physical structure of the apparatus. Figure 8 which shows a front view of the apparatus has certain dials which have already been referred to. The grill 197 covers the electro-acoustic transducer 12 of Figure 1. 198 indicates a plug for the pick-up coil or electromagnetic transducer 2 of Figure 1 which is shown by the heavy black line 2 in Figure 8. A shelf 199 is provided on which the telephone set may rest and the coil 2 may be under the phone in the recess 200, Figure 6 or in a bell box where a bell box is used. The telephone hand set comprising a normal transmitter and receiver is supported by a yoke 201 which is shown in side view in Figure 6.

On the lower half of the case only two knobs are provided, the knob 182 which is the volume control and the knob 202 which is tied in with the gang switch, the indicator for which is shown at 203 in the center of the dial 204. The indicator pointer 203 and the knob 202 are coupled to turn together.

The dial 204 is inscribed with proper legends corresponding to positions of the gang switch from the "off" position which is No. 1 to the last position which is No. 11. These positions on the dial 204 may be indicated according to the following table: No. 1—Off; No. 2—Telephone Answer; No. 3—Telephone Speech; No. 4—Record On Lower; No. 5—Play Lower; No. 6—Rewind Lower; No. 7—Edit Lower; No. 8—Edit Upper; No. 9—Rewind Upper; No. 10—Record On Upper; No. 11—Play Upper.

These positions of gang switch have been previously described in detail and need not be here further described.

A cabinet arrangement of Figure 8 is shown somewhat diagrammatically in Figure 9 with the various units in position and the walls of the casing shown in dotted outline. This as will be noted have legends properly indicating the various component parts of the system and show the relative positions of the telephone base over the pick-up coil or electro-magnetic transducer 2. As has been previously mentioned, this coil is plugged in at 198 (see Figure 8) and may therefore be placed in any position where the telephone bell box is located. The arrangement for lifting the telephone however which would correspond to the telephone base being positioned on the shelf 199 is shown more particularly in Figure 6. The bracket 201 is formed as a U shaped member with the side arms provided with channels or recesses 208 which fit beneath the telephone hand set. The U-shaped bracket is suitably held by nuts and bolts to the upright plate or bar 209 of a right angle lever 210 which is hinged at the inside wall of the cabinet at 211 by means of the hinge 212. The horizontal arm 213 of the lever at the other end is spring tensioned by means of a coil spring 214 upwards which normally maintains the telephone in a downward position on the telephone base. A light connecting chain 215 with link adjustments extend downward and at its end is connected to the plunger 216 of the solenoid 68 by a suitable coupling element. The element 68 as previously described is the telephone solenoid and this is preferably mounted on the power chassis which is the next to the last unit in the cabinet. As indicated the power chassis is supported by the frame of the cabinet with rubber shock absorbers 217 which also are preferably used to support other units in the cabinet so that any sudden operations or actuations by means of release of solenoids will not introduce noise or shocks into the system.

It will also be noted that the arm 213 of the lever 210 is adjusted by means of a cushion stop 218 which is provided with a rubber grommet set in the hole of the bar 213 and is adjusted in a vertical position as shown in Figure 6 by a bolt and lock nut as shown in the drawing, so that when the lever arm 213 is drawn downward it will have safety limit of motion depending upon the setting of the lock nuts 219. The operation of the lifting arrangement of Figure 6 follows from the description given above. When the telephone lift solenoid 68 is actuated, the plunger 216 is drawn downward until the arm 213 and 209 respectively occupy their dotted line positions, raising the bracket 201 also to its dotted line position lifting the telephone head set sufficiently off of its cradle. The telephone head set is only raised enough so that the contacts beneath it are clear. It, however, remains just over its normal position in the cradle of the telephone base. In order for the system to work efficiently, the telephone base should be specifically positioned and for this purpose a slight recess is provided in the shelf 199 which may be by means of an upwardly projecting frame 220 just large enough to receive the bottom edge of the telephone base. For height adjustment to the phone, the bar 209 is provided with two slots, 221 and 222 in which the bracket 201 is movable for adjustment and tightening in such position that when the lever 210 is drawn upward against its stop 218, the telephone head set will rest normally on the contacts in the base. Other adjustments are provided by the link connection 215 and by adjustment of the stop 218.

Having now described my invention, I claim:

1. In a system of the type described, an automatic telephone answering and recording means including electrical means responsive to telephone ringing comprising a ringing pulse rectifying circuit, a relay operated in pulses by said ringing pulse rectifying circuit, a timer motor initially connected to and operated by said relay for pulsing the timer motor, in short movements and cams operative by said timer motor having associated switch elements controlled by said cams whereby after initial pulsing of said timer motor said cams operate said associated switch elements for independently beginning a continuous rotation of the timer motor, further relay means operative by said switch elements including means for raising a telephone receiver from its cradle, a recording transport operatively controlled by said switches operated by said cam for repeating a recorded message to the telephone and a second transport also controlled by said switches controlled by said cams for receiving a message given by the telephone including further relay means operative by said cams for changing the system announcement of a recorded message to recording of a received message.

2. In a system of the type described, an automatic telephone answering and recording means including electrical means responsive to telephone ringing comprising a ringing pulse rectifying circuit, a timer motor initially connected to and operated by said ringing pulse rectifying circuit connected thereto having associated switch elements operative for initiating and continuing the operation of the timer motor through a given cycle established by said cams to an initial position at the beginning of the cycle, means operatively associating said timing motor and cams with said rectifying circuit, relay means operative by said switch elements, means for raising the telephone receiver from its cradle operative by said relay means, means controlled by said cams in the rotation of the timer motor for first giving a recorded message to the telephone system and then for receiving and recording a message given by the telephone system and means operative by a telephone dial tone and the like signal for releasing the telephone raising means to permit the telephone to be reseated in its cradle without interruption of the timer motor operation whereby the system may be recycled to its initial stand by position.

3. In a system of the type described, an automatic telephone answering and recording means including electrical means responsive to telephone ringing comprising a ringing pulse rectifying circuit, a timer motor initially connected to and operated by said ringing pulse rectifying circuit connected thereto having associated switch elements operative for initiating and continuing the operation of the timer motor through a given cycle established by said cams to an initial position at the beginning of the cycle, means operatively associating said timing motor and cams with said rectifying circuit, relay means operative by said switch elements, means for raising the telephone receiver from its cradle operative by said relay means, means controlled by said cams in the rotation of the timer motor for first giving a recorded message to the telephone system and then for receiving and recording a message given by the telephone system and means operative by a telephone dial tone and the like signal for releasing the telephone raising means to permit the telephone to be reseated in its cradle without interruption of the timer motor operation whereby the system may be recycled to its initial stand by position comprising a relaxation oscillator circuit having a time constant for operation substantially longer than a normal speech pulse, a relay operative by said rectifying circuit for controlling the operation of said relaxation oscillator and relay means connected in the output circuit of relaxation oscillator for opening the circuit to said telephone raising means, said timer being otherwise uninterrupted to permit recycling of the system to its initial stand by position.

4. In a telephone answering and recording system, electrical means responsive to telephone ringing, means operative thereby in timed sequence comprising means for coupling the telephone instrument to the line, means for giving and repeating to said line a recorded announcement to the telephone instrument, means prepared to receive and record a given message from the telephone instrument, and means for returning said last two means to initial operative positions for successive repeated sequences and means responsive to a continued dial tone of the telephone system and extraneous sounds of a given duration during the said sequence for decoupling the telephone instrument from the line with a given time delay while the sequence is completing.

5. In a telephone answering and recording system, electrical means responsive to telephone ringing, means operative thereby in timed sequence comprising means for raising the telephone instrument for coupling the telephone instrument to the line, means for giving and repeating to said line a recorded announcement to the telephone instrument, means prepared to receive and record a given message from the telephone instrument, and means for returning said last two means to initial operative positions for successive repeated sequences, and means responsive to a continued dial tone of the telephone system and extraneous sounds of a given duration during the operation of said previous means other than the first for decoupling the telephone instrument from the line with a given time delay while the sequence is completing including a relaxation oscillator, and means controlled thereby for releasing the means for raising the telephone instrument.

6. In a telephone answering and recording system, electrical means responsive to the telephone ringing comprising an electromagnetic transducer, telephone pick-up preamplifier means having a stand-by position and operative in said standby position to receive a signal from said electromagnetic transducer, amplifier means operated thereby, a rectifier circuit connected to the output of said amplifier means, a relay operatively connected to said rectifier circuit, a timer circuit and switching means initiated into operation by said rectifier circuit, means operated in timed sequence by said relay comprising means for raising the telephone instrument off its seat, telegraphone transport means operative to announce a recorded message to the telephone transmitter, a change-over relay operative by said timer circuit and switching means for disconnecting said first transport and connecting a second telegraphone transport means operative for receiving a message given by the telephone receiver said second telephone transport means and means for returning the elements to standby position for successive repeated sequences.

7. In a telephone answering and recording system, electrical means responsive to the telephone ringing comprising an electromagnetic transducer, telephone pick-up preamplifier means having a stand-by position and operative in said standby position to receive a signal from said electromagnetic transducer, amplifier means operated thereby, a rectifier circuit connected to the output of said amplifier means, a relay operatively connected to said rectifier circuit, a timer circuit and switching means initiated into operation by said rectifier circuit, means operated in timed sequence by said relay comprising means for raising the telephone instrument off its seat, telegraphone transport means operative to announce a recorded message to the telephone transmitter, a change-over relay operative by said timer circuit and switching means for disconnecting said first transport and connecting a second telegraphone transport means operative for receiving a message given by the telephone receiver said second telephone transport means, means for returning the elements to standby position for successive repeated sequence and a second relay operated in parallel with said first mentioned relay, a relaxation circuit having a given time constant controlled thereby and means energized by the operation of relaxation circuit for returning the telephone to its seat when said relaxation circuit has been operated by a signal longer than the given time constant.

8. In a system of the type described for automatic telephone answering and recording, means including electrical means responsive to telephone ringing, timer means associated therewith for controlling in selected sequence in response to said telephone ringing the following means operated thereby including means for simultaneously connecting the telephone instrument into the telephone circuit and means for announcing a message thereto, and subsequent thereto, means for receiving and recording a message received by said telephone, means responsive to a signal given by a distant party for halting the operation of the timer means in either the position of announcement of a message or the recording of a message received by the telephone from the distant party, telegraphone transport means included in said previous means for announcing a message and recording a message operatively controlled through means responsive to said signal for causing said transport means to run in a forward or rewind direction.

9. In a system of the type described for automatic telephone answering and recording, means including electrical means responsive to telephone ringing, timer means associated therewith for controlling in selected sequence in response to said telephone ringing the following means operated thereby including means for simultaneously connecting the telephone instrument into the telephone circuit and means for announcing a message thereto, and subsequent thereto, means for receiving and recording a message received by said telephone, means at the automatic telephone answering station responsive to a signal given by a distant party, switching means operated by said last means for halting the operation of the timer means in either the position of announcement of a message or the recording of a message received by the telephone from the distant party and means also controlled by said switching means in response to further signals for further operating either for announcing a message or for receiving and recording a message received by said telephone respectively.

10. In a system of the type described for automatic telephone answering and recording, means including electrical means responsive to telephone ringing, a telegraphone transport means, means operated by said electrical means for causing said telegraphone transport means to give an announcement of messages to the telephone, a telegraphone transport means for recording messages transmitted over the telephone, means responsive to said ringing for raising the telephone instrument from its seat, a timer control means responsive to said telephone ringing for operating in selected sequence, the means for connecting the telephone instrument into the telephone circuit, said telegraphone transport means for announcement of messages to the telephone and said telegraphone transport, means for recording messages transmitted over the telephone, means at the automatic telephone answering station responsive to a signal given by a distant party, switching means operated by said last means for halting the operation of said timer control either during the operation of said telegraphone transport for announcement or said telegraphone transport for receiving and means also responsive to a repetition of said signal for operating said transports in forward or in rewind directions.

11. In a system of the type described for automatic telephone answering and recording, means including electrical means responsive to telephone ringing, a telegraphone transport means, means operated by said electrical means for causing said telegraphone transport means to give an announcement of messages to the telephone, a telegraphone transport means for recording messages transmitted over the telephone, means responsive to said ringing for raising the telephone instrument from its seat, a timer control means responsive to said telephone ringing for operating in selected sequence, the means for connecting the telephone instrument into the telephone circuit, said telegraphone transport means for announcement of messages to the telephone and said telegraphone transport, means for recording messages transmitted over the telephone, means at the automatic telephone answering station responsive to a signal given by a distant party, switching means operated by said last means for halting the operation of said timer control during the operation of said telegraphone transport for announcement or rewinding the other transport carrying the recorded telephone messages, said switching means being responsive to a second operation by said signal for causing said other telegraphone transport to play said recorded messages, said switching means being responsive to a third operation by said signal for causing said other transport to rewind, said switching means being responsive to a fourth operation by said signal for causing said transport carrying the announcement to travel in the rewind direction and said switching means being responsive to a fifth operation by said signal for causing the system to return to normal standby telephone answering.

12. In a system of the type described for automatic telephone answering and recording, means including electrical means responsive to telephone ringing, a telegraphone transport means, means operated by said electrical means for causing said telegraphone transport means to give an announcement of messages to the telephone, a telegraphone transport means for recording messages transmitted over the telephone, means responsive to said ringing for raising the telephone instrument from its seat, a timer control means responsive to said telephone ringing for operating in selected sequence, the means for connecting the telephone instrument into the telephone circuit, said telegraphone transport means for announcement of messages to the telephone and said telegraphone transport, means for recording messages transmitted over the telephone, means at the automatic telephone answering station responsive to a signal given by a distant party, switching means operated by said last means for halting the operation of said timer control during the operation of said telegraphone transport for reception of a message or rewinding said transport carrying recorded messages, said switching means being responsive to a second operation by said signal for causing said telegraphone operative for reception for recording, said switching means being responsive to a third operations by said signal for causing said telegraphone to rewind said switching means being responsive to a fourth operation by said signal for causing said other mentioned transport to travel in rewind direction and said switching means being responsive to a fifth operation by said signal for causing the system to return to normal standby telephone answering.

13. In a system of the type described for automatic telephone answering and recording, means including electrical means responsive to telephone ringing, timer means for controlling in selected sequence in response to said telephone ringing the following means including, means for simultaneously connecting the telephone instrument into the telephone circuit and means for announcing a message thereto, and subsequent thereto, means for receiving and recording a message received by said telephone in combination with means at the automatic telephone answering station responsive to a signal given by a distant party over the telephone lines, stepping switch means operative by the previous means in response to successive signals given by the distant party over the telephone lines for controlling the means for announcing a message and for receiving and recording a message received by said telephone.

14. In a system of the type described for automatic telephone answering and recording, means including electrical means responsive to telephone ringing, timer means for controlling in selected sequence in response to said telephone ringing the following means including, means for simultaneously connecting the telephone instrument into the telephone circuit and means for announcing a message thereto, and subsequent thereto, means for receiving and recording a message received by said telephone in combination with resonant relay means at the automatic answering station responsive to a signal given by a distant party over the telephone lines, means responsive to said resonant relay means, a stepping switch responsive to the means responsive to said resonant relay means, means operative by said stepping switch for controlling the means for announcing a message and for receiving and recording a message received by said telephone.

15. In a telephone system, electrical means responsive to telephone ringing, means operative thereby for coupling the telephone apparatus to the communication line for receiving a signal for a desired time interval and means responsive to a continued dial tone of the telephone line and extraneous sounds of a given duration for decoupling the telephone apparatus from said line at any time during said desired time interval.

16. In a telephone system, electrical means responsive to telephone ringing, a timer switch operative in response to said ringing, means operative thereby in timed sequence for coupling the telephone apparatus to the communication line, and for receiving a communication over the line, and means responsive to a continued dial tone transmitted over the telephone system and extraneous sounds of a given duration for decoupling the telephone apparatus from said line while the timer switch continues in operation to restore the telephone answering system to standby position, means responsive to signals given over the line, a stepping switch controlled and operated by said signals for eliminating the influence of said timer switch and means responsive to the dial tone, and circuit means operated by said stepping switch.

17. In a telephone system, electrical means responsive to telephone ringing, a timer switch operative in response to said ringing, means operative thereby in timed sequence for coupling the telephone apparatus to the communication line, and for receiving a communication over the line, and means responsive to a continued dial tone and extraneous sounds of a given duration transmitted over said communication lines for decoupling the telephone apparatus from said line while the timer switch continues in operation to restore the telephone answering system to standby position, means responsive to signals given over the line, for eliminating the influence of said timer switch and means responsive to the dial tone, and circuit means operated by said stepping switch, said circuit means including means for impressing a response on the telephone line during the operation of the stepping switch.

18. In a system of the type described having an automatic telephone answering and recording means and a pair of telegraphone transports, gang switch means, means operative in response to the telephone ringing for operating the gang switch and means operative by said gang switch for transferring a record from either transport to the other.

19. In a system of the type described having an automatic telephone answering and recording means and a pair of telegraphone transports, gang switch means, means operative in response to the telephone ringing for operating the gang switch and means operative by said gang switch for transferring a record from a given place on one transport to a given place on the other transport.

20. In a system of the type described having an automatic telephone answering and recording means including telegraphone transport means, gang switch means, means operative in response to the telephone ringing for operating the gang switch and means operative by said gang switch for establishing circuit to a typist control station and switch means at said typist control station for controlling the operation of said transport means for playing a message thereon.

21. In a system of the type described having an automatic telephone answering and recording means and a pair of telegraphone transports, gang switch means, means operative in response to the telephone ringing for operating the gang switch and means operative by said gang switch for recording on either of said transports sounds produced at the telephone answering and recording end of the system including relaxation oscillator keying means for running the transports for a given time interval.

22. In a telephone answering and recording system, electrical means responsive to telephone ringing, means operative by said electrical means for raising a telephone from its seat for telephone communication with a distant party on the other end of the telephone line, means responsive to a signal given by the distant party for controlling the operating of the answering and recording system including telegraphone transport means for recording and reproducing, switching means for controlling the operation of said telegraphone transport means for recording and reproducing and means operative by said means responsive to said signal for controlling the operation of said switching means for running said transport means at the will of the distant party to one end thereof, and means operative thereby for deenergizing the system and returning the telephone to its seat.

23. In a system of the type described for automatic telephone answering and recording, means including electrical means responsive to telephone ringing, a telegraphone transport means, means operated by said electrical means for causing said telegraphone transport means to give an announcement of messages to the telephone, a telegraphone transport means for recording messages transmitted over the telephone, means responsive to said ringing for raising the telephone instrument from its seat, a timer control means responsive to said telephone ringing for operating in selected sequence, the means for connecting the telephone instrument into the telephone circuit, said telegraphone transport means for announcement of messages to the telephone and said telegraphone transport means, means for recording messages transmitted over the telephone, means at the automatic telephone answering station responsive to a signal given by a distant party, swtiching means operated by said previous means for halting the operation of said timer control either during the operation of said telegraphone transport for announcement or said telegraphone transport for receiving, means also responsive to a repetition of said signal for operating said transports in forward and in rewind directions, dial control means connected in parallel with the means operating said timer for replacing the telephone on its seat, and means for paralyzing the dial control means while the timer is halted.

24. In a system of the type described for automatic telephone answering and recording, means including electrical means responsive to telephone ringing, a telegraphone transport means, means operated by said electrical means for causing said telegraphone transport means to give an announcement of messages to the telephone, a telegraphone transport means for recording messages transmitted over the telephone, means responsive to said ringing for raising the telephone instrument from its seat, a timer control means responsive to said telephone ringing for operating in selected sequence, the means for connecting the telephone instrument into the telephone circuit, said telegraphone transport means for announcements of messages to the telephone and said telegraphone transport, means for recording messages transmitted over the telephone, means at the automatic telephone answering station responsive to a signal given by a distant party, switching means operated by said last means for halting the operation of said timer control during the operation of said telegraphone transport for announcement or rewinding the other transport carrying the recorded telephone messages, said switching means being responsive to a second operation by said signal for causing said other telegraphone transport to play said recorded messages, said switching means being responsive to a third operation by said signal for causing said other transport to rewind, switching means being responsive to a fourth operation by said signal for causing said transport, transport carrying announcement, to travel in the rewind direction and said switching means being responsive to a fifth operation by said signal for causing the system to return to normal standby telephone answering, dial control means connected in parallel with the means operating said timer for replacing the telephone on its seat, and means for making non-operative the dial control means while the timer is halted.

25. In a system of the type described for automatic telephone answering and recording, means including electrical means responsive to telephone ringing, a telegraphone transport means, means operated by said electrical means for causing said telegraphone transport means to give an announcement of messages to the telephone, a telegraphone transport means for recording messages transmitted over the telephone, means responsive to said ringing for raising the telephone instrument from its seat, a timer control means responsive to said telephone ringing for operating in selected sequence, the means for connecting the telephone instrument into the telephone circuit, said telegraphone transport means for announcement of messages to the telephone and said telegraphone transport, means for recording messages transmitted over the telephone, means at the automatic telephone answering station responsive to a signal given by a distant party, switching means operated by said last means for halting the operation of said timer control during the operation of said telegraphone transport for reception of a message or rewinding said transport carrying recorded messages, said switching means being responsive to a second operation by said signal for causing said telegraphone operative for reception for recording, said switching means being responsive to a third operation by said signal for causing said telegraphone to rewind, said switching means being responsive to a fourth operation by said signal for causing said other mentioned transport to travel in rewind direction and said switching means being responsive to a fifth operation by said signal for causing the system to return to normal standby telephone answering, and beep signal means operatively controlled by said means responsive to said signal given by a distant party for impressing a signal in the telephone system audible at the end of the distant party whereby the distant party will know that said switching means has responded properly.

26. In a system of the type described for automatic telephone answering and recording, means including electrical means responsive to telephone ringing, timer means for controlling in selected sequence in response to said telephone ringing the following means including, means for simultaneously connecting the telephone instrument into the telephone circuit and means for announcing a message thereto, and subsequent thereto, means for receiving and recording a message received by said telephone in combination with resonant relay means at the automatic answering station responsive to a signal given by a distant party over said telephone lines, means responsive to said resonant relay means, a stepping switch responsive to the means responsive to said resonant relay means, means operative by said stepping switch for controlling the means for announcing a message and for receiving and recording a message received by said telephone and beep signal means operatively controlled by said means responsive to said signal given by a distant party for impressing a signal on the telephone system audible at the end of the distant party whereby the distant party will know that said switching means has responded properly.

27. In an automatic telephone answering system for a telephone having a base with a telephone hand set resting thereon, electrical means responsive to a telephone ringing signal, lever means actuated thereby having a pivot secured between its ends with the actuation at one end thereof, a member at the other end of said lever having branches with recesses near their ends facing upwards and positioned just beneath a telephone hand set on each side of the telephone base, spring loading means for counterbalancing said actuating end of said lever and means for adjusting the height of said member to accommodate the position of the hand set on said base.

28. In an automatic telephone answering system for a telephone having a base with a telephone hand set resting thereon, electrical means including a solenoid having a plunger, lever means, adjustable coupling means connecting the plunger with one end of the lever means, spring loading means for counterbalancing said lever at the plunger end thereof cushioning stop means limiting the movement of the lever, said lever means having a pivot secured between its ends, a member at the other end of said lever having branches with recesses near their end facing upwards and positioned just beneath a telephone hand set on each side of the telephone base.

29. In a system of the type described, an automatic telephone answering and recording means including electrical means responsive to telephone ringing comprising a ringing pulse rectifying circuit, a relay operated in pulses by said ringing pulse rectifying circuit, a timer motor initially connected to and operated by said relay for pulsing the timer motor in short movements and cams operative by said timer motor having associated switch elements controlled by said cams whereby after initial pulsing of said timer motor said cams operate said associated switch elements for independently beginning a continuous rotation of the timer motor, further relay means operative by said switch elements including means for raising a telephone receiver from its cradle, means controlled by said cams in the rotation of the timer motor for first repeating a recorded message to the telephone system and then for receiving and recording a message given by the telephone system.

References Cited in the file of this patent

UNITED STATES PATENTS

| | | |
|---|---|---|
| 1,993,486 | Ricchairdi | Mar. 5, 1935 |
| 2,005,788 | Keiser | June 25, 1935 |
| 2,072,316 | Schulz | Mar. 2, 1937 |
| 2,082,303 | Schiller | June 1, 1937 |
| 2,165,546 | Heller | July 11, 1939 |
| 2,261,420 | Shively | Nov. 4, 1941 |
| 2,282,100 | Thompson | May 5, 1942 |
| 2,284,173 | Soukup et al. | May 26, 1942 |
| 2,329,107 | Clausen | Sept. 7, 1943 |
| 2,374,842 | Shively | May 1, 1945 |
| 2,472,435 | Peterson | June 7, 1949 |
| 2,497,037 | Somers | Feb. 7, 1950 |
| 2,528,459 | Thompson | Oct. 31, 1950 |
| 2,533,234 | Edwards | Dec. 12, 1950 |
| 2,539,139 | Jordanoff | Jan. 23, 1951 |
| 2,549,548 | Von Zimmerman | Apr. 17, 1951 |
| 2,558,040 | Carter | June 26, 1951 |
| 2,658,107 | Zimmermann | Nov. 3, 1953 |
| 2,709,202 | Handschin | May 24, 1955 |